(12) United States Patent
Tolia et al.

(10) Patent No.: US 9,940,008 B2
(45) Date of Patent: *Apr. 10, 2018

(54) SOCIAL NETWORKING BASED ON NEARBY NEIGHBORHOODS

(71) Applicant: NEXTDOOR.COM, INC., San Francisco, CA (US)

(72) Inventors: Nirav N. Tolia, San Francisco, CA (US); Ryan Patrick Sims, San Francisco, CA (US); David Michael Wiesen, San Francisco, CA (US); Sean Christopher Bromage, San Francisco, CA (US); Rishi Mukhopadhyay, San Francisco, CA (US); Timothy Garleung Wong, San Francisco, CA (US); Michael Philip Balaban, San Francisco, CA (US); Madison Nixon Bell, San Francisco, CA (US)

(73) Assignee: NEXTDOOR.COM, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/087,879

(22) Filed: Mar. 31, 2016

(65) Prior Publication Data

US 2016/0274785 A1    Sep. 22, 2016

Related U.S. Application Data

(63) Continuation of application No. 14/277,005, filed on May 13, 2014, which is a continuation-in-part of application No. 13/757,574, filed on Feb. 1, 2013.

(51) Int. Cl.
*H04W 4/20* (2009.01)
*H04W 4/02* (2009.01)
(Continued)

(52) U.S. Cl.
CPC ........ *G06F 3/04847* (2013.01); *G06F 3/0482* (2013.01); *G06F 3/04842* (2013.01);
(Continued)

(58) Field of Classification Search
CPC .. G06F 3/04847; G06F 3/0482; H04W 4/021; H04W 4/206
(Continued)

(56) References Cited

U.S. PATENT DOCUMENTS 8,660,541 B1 * 2/2014 Beresniewicz ......... H04W 4/02
455/404.2
8,723,679 B2   5/2014 Whisenant
(Continued)

FOREIGN PATENT DOCUMENTS

KR       10-1069834 B1     10/2011
KR       10-2012-0121376 A  11/2012
WO       WO2008/105766 A1   9/2008

OTHER PUBLICATIONS

International Search Report and Written Opinion dated May 13, 2014, in application No. PCT/US2014/014313, 11 pages.
(Continued)

*Primary Examiner* — Minh Chau Nguyen
(74) *Attorney, Agent, or Firm* — Hickman Palermo Becker Bingham LLP

(57) ABSTRACT

Disclosed embodiments relate to a system and a method of managing an online social network having a plurality of neighborhoods. The system may receive a location from a user, and select, based on the location, a neighborhood from the plurality of neighborhoods. The system may further assign the user to the selected neighborhood and grant the user access to communications by users assigned to the selected neighborhood. In an embodiment, a computer-
(Continued)

implemented method comprises creating and storing in computer data storage neighborhood data defining a plurality of geographical neighborhoods based upon a plurality of vertices or boundaries; using a computer, for each particular neighborhood among the plurality of neighborhoods, determining one or more nearby neighborhoods is associated with a geographical area proximate to the particular neighborhood; using the computer, receiving from a second computer that is associated with a user account, activation input specifying selections of one or more nearby neighborhoods as activated in association with the particular user account, wherein the activation input specifies fewer than all the one or more nearby neighborhoods; updating a database coupled to the computer to associate the selections of one or more nearby neighborhoods as activated in association with the particular user account; using the computer, receiving a request from the second computer to perform any of displaying a map page that includes the nearby neighborhoods, displaying a feed of messages, and creating a new message; using the computer, in response to the request, performing causing the displaying the map page that includes the nearby neighborhoods, causing displaying the feed of messages, or the creating the new message based upon only the selections of the one or more nearby neighborhoods as activated in association with the particular user account.

22 Claims, 14 Drawing Sheets

(51) Int. Cl.
  *G06F 3/0484* (2013.01)
  *G06Q 10/10* (2012.01)
  *G06Q 50/00* (2012.01)
  *G06F 3/0482* (2013.01)
  *G06F 17/30* (2006.01)

(52) U.S. Cl.
  CPC ....... *G06F 17/30241* (2013.01); *G06Q 10/10* (2013.01); *G06Q 50/01* (2013.01); *H04W 4/021* (2013.01); *H04W 4/206* (2013.01)

(58) Field of Classification Search
  USPC .................................................. 709/203–204
  See application file for complete search history.

(56) References Cited

U.S. PATENT DOCUMENTS

| | | | | |
|---|---|---|---|---|
| 8,732,219 B1* | 5/2014 | Ferries | .............. | G06F 17/30241 707/723 |
| 9,098,720 B2* | 8/2015 | Bosworth | .............. | G06Q 50/01 |
| 2005/0216362 A1 | 9/2005 | Navar | | |
| 2005/0273346 A1 | 12/2005 | Frost | | |
| 2006/0085419 A1 | 4/2006 | Rosen | | |
| 2007/0218900 A1 | 9/2007 | Abhyanker | | |
| 2007/0219712 A1 | 9/2007 | Abhyanker | | |
| 2007/0219716 A1 | 9/2007 | Shiragami | | |
| 2007/0233582 A1 | 10/2007 | Abhyanker | | |
| 2008/0097999 A1 | 4/2008 | Horan | | |
| 2008/0250025 A1 | 10/2008 | Abhyanker | | |
| 2009/0064144 A1 | 3/2009 | Abhyanker | | |
| 2009/0069034 A1* | 3/2009 | Abhyanker | .............. | H04W 4/02 455/456.3 |
| 2009/0099839 A1 | 4/2009 | Stefik | | |
| 2009/0132469 A1 | 5/2009 | White et al. | | |
| 2009/0132644 A1 | 5/2009 | Frishert | | |
| 2009/0216859 A1 | 8/2009 | Dolling | | |
| 2009/0218900 A1 | 9/2009 | Dickes | | |
| 2009/0265278 A1 | 10/2009 | Wang | | |
| 2010/0042364 A1* | 2/2010 | Nakamura | .............. | A63F 13/12 702/179 |
| 2012/0215898 A1 | 8/2012 | Shah | | |
| 2012/0254774 A1 | 10/2012 | Patton | | |
| 2013/0054317 A1 | 2/2013 | Abhyanker | | |
| 2013/0073371 A1 | 3/2013 | Bosworth | | |
| 2013/0132477 A1* | 5/2013 | Bosworth | .............. | G06Q 50/01 709/204 |
| 2013/0254397 A1 | 9/2013 | Lai | | |

OTHER PUBLICATIONS

European Patent Office, "Search Report", in application No. 1474504.5-1958, dated Jun. 21, 2016, 10 pages. European Claims in application No. 1474504.5-1958, dated Jun. 2016, 5 pages. Anonymous: "Social Networking Service—Wikipedia, the free encyclopedia", dated Jan. 30, 2013, From the internet, https://en.wikipedia.org/w/index.php?title=Social_networking_service, 24 pages.

U.S. Appl. No. 13/757,574, filed Feb. 1, 2013, Advisory Action, dated Jul. 7, 2016.

U.S. Appl. No. 14/277,005, filed May 13, 2014, Office Action, dated Aug. 26, 2016.

U.S. Appl. No. 13/757,574, filed Feb. 1, 2013, Office Action, dated Dec. 7, 2015.

U.S. Appl. No. 13/757,574, filed Feb. 1, 2013, Intetrview Summary, dated Feb. 23, 2016.

U.S. Appl. No. 13/757,574, filed Feb. 1, 2013, Interview Summary, dated Oct. 7, 2015.

U.S. Appl. No. 13/757,574, filed Feb. 1, 2013, Final Office Action, dated Jul. 16, 2015.

Tolia, U.S. Appl. No. 14/277,005, filed May 13, 2014, Final Office Action, dated Mar. 9, 2017.

Park, U.S. Appl. No. 13/757,74, filed Feb. 1, 2013, Final Office Action, dated May 8, 2017.

Park, U.S. Appl. No. 13/757,574, Filed Feb. 1, 2013, Interview Summary, dated Mar. 16, 2017.

Park, U.S. Appl. No. 13/757,574, filed Feb. 1, 2013, Office Action, dated Dec. 16, 2016.

Tolia, U.S. Appl. No. 14/277,005, filed May 13, 2014, Office Action, dated Jun. 29, 2017.

Park, U.S. Appl. No. 13/757,574, filed Feb. 1, 2013, Advisory Action, dated Jun. 22, 2017.

* cited by examiner

SOCIAL NETWORKING BASED ON NEARBY NEIGHBORHOODS

BENEFIT CLAIM

This application claims the benefit under 35 U.S.C. §120 as a Continuation of application Ser. No. 14/277,005, filed May 13, 2013, which is a Continuation-in-part of application Ser. No. 13/757,574, filed Feb. 1, 2013, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to digital data processing in the field of social networking in which user accounts are associated based upon location. The disclosure relates more specifically to improvements in user interfaces, communications and the association of data relating to groups of user accounts that are in different but nearby neighborhoods.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Online social networks are becoming an increasingly popular way of communication between Internet users. Online social networks facilitate the building and maintaining of social relations among people who share interests, activities, backgrounds, or real-life connections. Some online social networks are geared towards specific types of connections (e.g., LinkedIn mainly promotes professional networking), while others are not limited to any particular use (e.g., Facebook, Google+, Twitter). Online social networks can be global or have some national characteristics (e.g., Nexopia in Canada, and Vkontakte in Russia), but online social networks typically do not collect accurate and reliable residence information from their users, and therefore cannot offer many advantageous features requiring such information.

The present disclosure relates to methods and systems for a location-based online social network. The location-based online social network may provide communications to a user associated with a location.

SUMMARY

The appended claims may serve as a summary of the invention.

DETAILED DESCRIPTION

Figure 1:
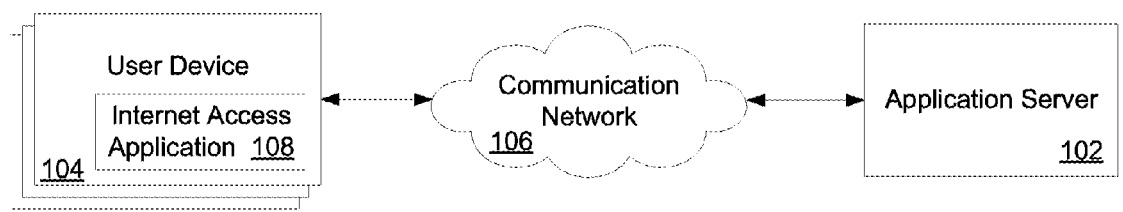
FIG. 1 is a block diagram illustrating an online social network system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described according to the following outline:
   1. General Overview
   2. Location-Based Social Networks
   3. Nearby Neighborhoods
   4. Interacting with Messages, Posts and Other Data Based Upon Constraints Relating to Nearby Neighborhoods
   5. Implementation Example—Hardware Overview
   1. General Overview Disclosed embodiments relate to a system and a method of managing an online social network having a plurality of neighborhoods. The system may receive a location from a user, and select, based on the location, a neighborhood from the plurality of neighborhoods. The system may further assign the user to the selected neighborhood and grant the user access to communications by users assigned to the selected neighborhood.

In an embodiment, a computer-implemented method comprises creating and storing in computer data storage neighborhood data defining a plurality of geographical neighborhoods based upon a plurality of vertices or boundaries; using a computer, for each particular neighborhood among the plurality of neighborhoods, determining one or more nearby neighborhoods is associated with a geographical area proximate to the particular neighborhood; using the computer, receiving from a second computer that is associated with a user account, activation input specifying selections of one or more nearby neighborhoods as activated in association with the particular user account, wherein the activation input specifies fewer than all the one or more nearby neighborhoods; updating a database coupled to the computer to associate the selections of one or more nearby neighborhoods as activated in association with the particular user account; using the computer, receiving a request from the second computer to perform any of displaying a map page that includes the nearby neighborhoods, displaying a feed of messages, and creating a new message; using the computer, in response to the request, performing causing the displaying the map page that includes the nearby neighborhoods, causing displaying the feed of messages, or the creating the new message based upon only the selections of the one or more nearby neighborhoods as activated in association with the particular user account.

Consistent with a disclosed embodiment, a computer-implemented method is provided for managing an online social network having a plurality of neighborhoods. The method includes receiving a location from a user and selecting, based on the location, a neighborhood from the plurality of neighborhoods. The method further includes assigning the user to the selected neighborhood, and granting the user access to communications by users assigned to the selected neighborhood. Consistent with another disclosed embodiment, a server is provided for managing an online social network having a plurality of neighborhoods. The server includes a processor and a memory storing instructions executable by the processor to provide the method discussed above. Consistent with yet another disclosed embodiment, a tangible non-transitory computer-readable storage medium is provided storing instructions configured to execute the method discussed above.

2. Location-Based Social Networks

Reference will now be made in detail to embodiments, examples of which are illustrated in the accompanying drawings. Wherever possible, the same reference numbers will be used throughout the drawings to refer to the same or like parts.

Online social networks with unrestricted global access have their advantages, but by ignoring the physical whereabouts of their users they fail to exploit the fact that people from the same geographical area, on average, have more in common than people living in different places. This is especially true for people living in the same immediate community, i.e., the same neighborhood. People living in the same neighborhood (e.g., within the same city, town, ZIP code, street block, etc.) are likely to share many interests and concerns even if they have never met in person. They are likely to go to the same shops, restaurants, and parks; their children go to the same schools; they are governed by the same local regulations; and so on.

In addition to sharing many of the same interests, people living in such proximity of each other are capable of providing physical assistance to each other, for example, by lending each other a ladder, giving each other rides to work, or helping each other to locate lost pets. Therefore, it would be highly advantageous to provide an online social network that is location-aware, such as, for example, one that is neighborhood-based.

Disclosed embodiments relate to a system and a method of managing an online social network having a plurality of neighborhoods. The system may receive a location from a user, and select, based on the location, a neighborhood from the plurality of neighborhoods. The system may further assign the user to the selected neighborhood and grant the user access to communications by users assigned to the selected neighborhood.

FIG. 1 is a block diagram illustrating an online social network system, in accordance with a disclosed embodiment. The online social network system can include, among other things, an application server 102, one or more user devices 104, and a communication network 106.

A user device 104 can be any device with communication and display capabilities. For example, a user device 104 can be a mobile device, such as a cellphone, a smartphone, or a tablet computer; or a PC, laptop computer, or smart TV. A user device 104 can include an internet access application 108, such as a web browser or a dedicated mobile application ("mobile app") providing the user with a convenient interface to the online social network. A user device 104 may include one or more processors capable of executing instructions configured to provide internet access application 108. The instructions can be stored on one or more tangible non-transitory computer-readable mediums, such as a hard disk, a compact disk (CD-ROM) a digital versatile disk (DVD-ROM or DVD-RAM) or semiconductor memory of any type.

User devices 104 can exchange data with application server 102 through communication network 106. Communication network 106 can be the Internet, or any other type of network or combination of networks, suitable for the data exchanges described herein. Thus, communication network 106 can include, for example, any combination of wired, wireless, LAN or WAN networks. Communication network 106 can also be implemented as a distributed "peer-to-peer" network. Communication network 106 can include cellular networks (e.g., 3GPP) or landline telephone networks, enabling data exchange not-only via IP-based protocols (e.g., HTTP, HTTPS, POP, IMAP, SMTP, SIP, SSH, etc.) but also via text messages, automatic or personal phone calls, voicemails, etc. Furthermore, communication network 106 can include non-electronic means of data exchange, such as regular mail (e.g., postcards).

Application server 102 can be any computer system with networking capabilities, and can include one or more hardware devices and/or software components. Application server 102 can include one or more processors capable of executing instructions. For example, application server 102 can include one or more general purpose central processing units (CPUs), field-programmable gate arrays (FPGAs), or digital signal processors (DSPs). The instructions can be stored on one or more tangible non-transitory computer-readable mediums, such as a hard disk, a compact disk (CD-ROM) a digital versatile disk (DVD-ROM or DVD-RAM) or semiconductor memory of any type.

Application server 102 can store and process information related to an online social network, as described in detail below. For instance, application server 102 can have one or more databases for storing user information, such as login credentials, full name, address, account settings, etc. In addition, application server 102 can have one or more databases for storing user communications, such as personal messages, posts, comments, etc.

Application server 102 can communicate with user devices 104 through communication network 106. For example, application server 102 can receive and process users' requests, such as a request to create a new account, to log into an existing account, to send a message to another user, to create a post and share them with other users, to receive a list of other user's recent posts and comments, and so on. After processing the user's request, application server 102 can, for example, access one or more databases to store and/or load data, and send a response to the user.

Exchange of data between application server 102 and user 104 can be facilitated by internet access application 108, which can, for example, provide the user with a graphical interface through which the user can enter requests to and visualize responses from application server 102.

Although particular types of devices and networks are described, it will be appreciated that other devices and networks can be used without departing from the spirit and scope of the embodiments described herein.

Figure 2A:
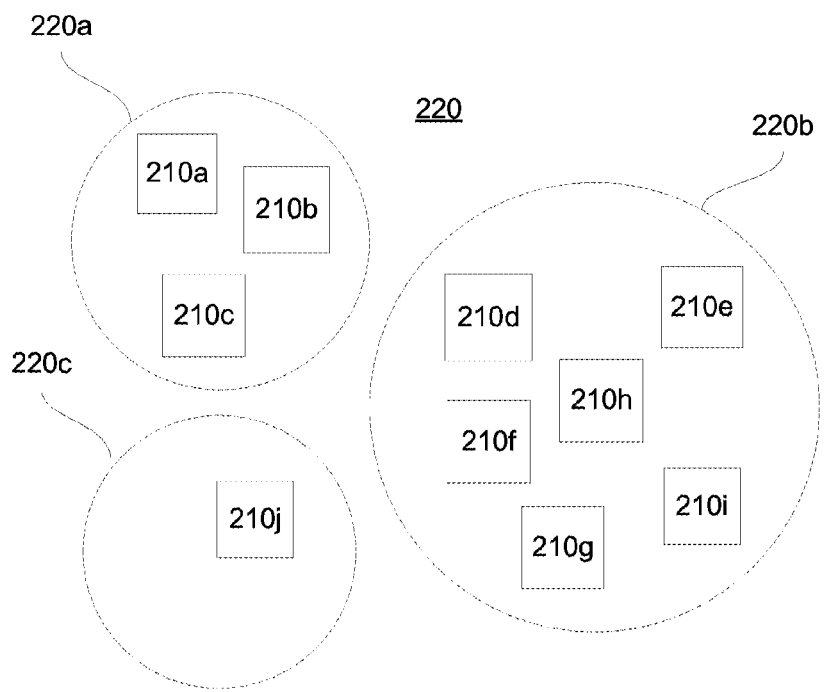
FIG. 2A is a schematic diagram of an online social network.

FIG. 2A is a schematic diagram of an online social network 200, in accordance with a disclosed embodiment. Online social network 200 comprises a plurality of users 210a-210j (collectively, 210) who are arranged in a plurality of virtual groups called "neighborhoods" 220a-220c (collectively, 220). In some embodiments, each user 210 is associated with one neighborhood 220. A user 210 that is associated with a neighborhood 220 can also be said, for example, to "belong to," "be in," "be from," "be assigned to," or "be a member of" that neighborhood 220. In other embodiments, a user can be assigned to more than one neighborhood 220.

In an embodiment, a user 210 is assigned to a particular neighborhood 220 based on the user's place of residence, as defined, for example, by an address or by the spatial coordinates of the user's home. Each neighborhood 220 can be associated with a real-world geographical area, and the user can be assigned to the neighborhood 220 that is associated with a geographical area that encompasses the user's place of residence.

Figure 2B:
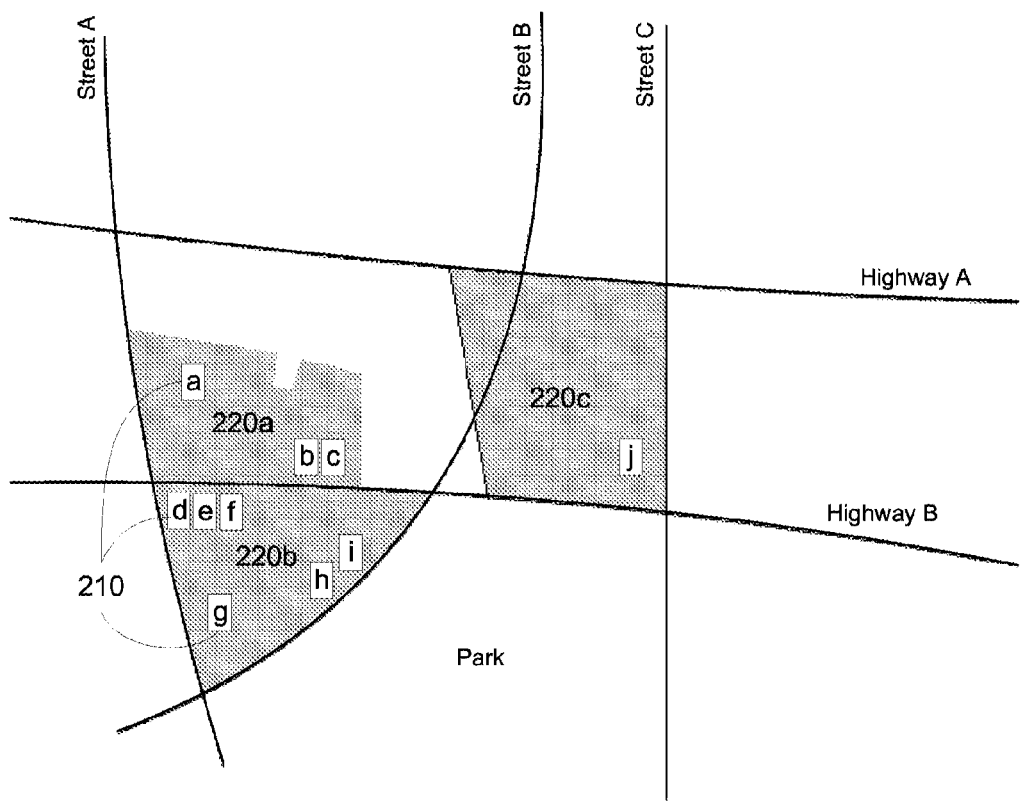
FIG. 2B is a map showing geographical areas associated with neighborhoods of the online social network.

FIG. 2B is a map showing the geographical areas associated with neighborhoods 220a-220c, and the addresses of users 210a-210j of the online social network 200. Geographical areas associated with neighborhoods 220 can be defined by boundaries (hereinafter, "neighborhood boundaries"). As illustrated in FIG. 2B, neighborhood boundaries can have different shapes and sizes and can be defined in a number of ways. In some embodiments, neighborhood boundaries can be defined based on existing maps, such as street maps, ZIP-code maps, maps of subdivisions and homeowners associations, or neighborhood maps existing in some municipalities. The boundaries can also be based on man-made or natural barriers, such as buildings, roads, parks, rivers or lakes. The boundaries can be drawn by users 210, administrators of the online social network 200, or automatically defined by a computer, for example, by an application server (e.g., application server 102). Users 210 or administrators of the online social network 200 can modify the computer-generated boundaries and draw their own neighborhood boundaries.

In some embodiments, neighborhood boundaries corresponding to different neighborhoods 220 cannot cross each other, that is, the geographical areas associated with the different neighborhoods 220 cannot overlap. In other embodiments, the geographical areas can overlap, and some addresses may be included in more than one geographical area. In some embodiments, users living at such addresses can choose which of the neighborhood 220 they want to be associated with.

Figure 3:
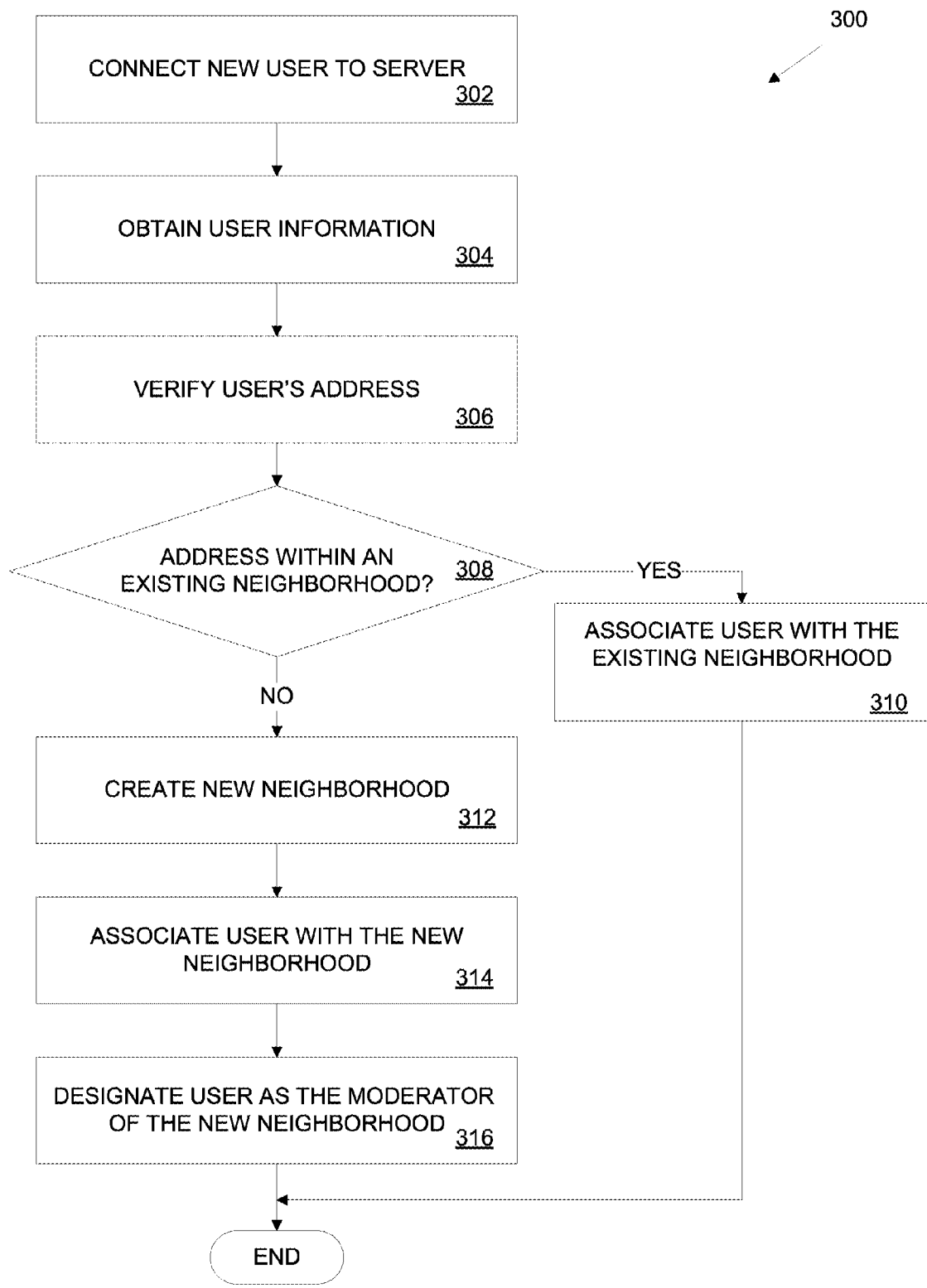
FIG. 3 is a flowchart illustrating a method of adding a new user to the online social network.

FIG. 3 is a flowchart illustrating a method 300 of adding a new user 210 to online social network 200. Method 300 can be implemented by an application server (e.g., application server 102). While the flowchart discloses the following blocks in a particular order, it is appreciated that the blocks can be moved, modified, combined, or deleted where appropriate. 3 In block 302, the user connects to the application server. For example, the user can use internet access application 108 running on user device 104 to connect via communication network 106 to the application server.

After connecting to the application server, if user does not already have an account with online social network, in block 304, the application server can create a new account for the user. The user can provide to the application server his or her personal information, such as a full name, address, username, password, etc. In some embodiments, the user is required to disclose the user's physical address, including, for example, house and apartment number, street name, city/town name, state name, zip code, and/or country name, etc. In other embodiments, approximate address information (e.g., zip code or city/town name only,) can be sufficient.

In some embodiments, in block 306, after receiving the address information from the user, the application server can, optionally, verify the provided address. The address can be verified, for example, by receiving from the user a number of a credit card associated with the address, and charging that credit card with a symbolic sum (e.g., $0.01) in order to compare the credit card's billing address with the user-provided address. Alternatively, a postcard comprising a verification code can be sent to the provided address. Upon receiving the postcard in the mail, the user can re-connect to the application server and provide it with the received verification code as printed on the postcard.

In some embodiments, the application server can access a database in which people's addresses are associated with residents' phone numbers and/or full names. If the address provided by the user is associated in the database with a phone number, the application server can send the verification code to that phone number, for example, using a text message or an automatically generated voice message. If the address provided by the user is associated in the database with one or more resident names, the application server can also verify, for example, that the user's last name matches the last name of any of the residents associated with the address.

In some embodiments, the application server can verify the user's address by first verifying the user's real name, for example, by asking the user to log into an existing online account that is likely to be associated with the user's real name (e.g., Facebook). After verifying the user's real name the application server can check, using the database described above, that the name is associated with the provided address. In some embodiments, the application server compares two addresses by first normalizing each address to comply with a certain address format.

In some embodiments, the application server can access databases that can reliably associate the user's IP address with the user's home address. Such databases can be obtained, for example, from Internet-service providers, such as Comcast or AT&T. The application server can use that database to compare the provided user address with the home address associated with the IP address from which the user has logged into the online social network 200.

In some embodiments, if the user is connected to the application server from a device (e.g., a smart phone) equipped with a GPS unit or any other geolocation service, internet access application 108 can, with the user's permission, periodically send to the application server the device's coordinates. The application server can then compare the received coordinates with coordinates associated with the provided address, as obtained, for example, from a geocoding resource. The application server can then determine that the address is verified if the user spends a predefined period of time (e.g., 24 hours) at or within a predefined distance from that address.

In some embodiments, the verification at block 306 can be omitted. For example, if the new user was invited by an existing user from the same neighborhood 220, the application server can decide that address verification is not necessary. In some embodiments, a new user who has not been invited can identify existing users who can confirm that he or she lives at the specified address. The application server can then contact the identified user and ask that user for a confirmation. In some embodiments, to improve reliability and accountability of the invitation/confirmation system described above, the name of the inviting/confirming user can be available as a part of the new user's information visible to other users.

In some embodiments, unverified or partially verified users (e.g., users whose ZIP code was verified, but not the full address) can still have access to the online social network, but their access may be restricted. For example, they may be given "read-only" rights allowing them only to read other neighbors' posts and comments, but not allowing them to create their own posts or make comments.

In block 308, after receiving and (optionally) verifying the user's address, the application server can determine whether the address falls within the boundaries of an existing neighborhood 220. For example, the boundaries of existing neighborhoods 220 can be defined by an ordered set of latitude-longitude points and stored in a database on the application server. The application server can obtain the coordinates of the user's address in the same coordinate system, and determine whether those coordinates are located inside the boundaries of any neighborhood 220. If the user's address cannot be tied to a coordinate or set of coordinates, in some embodiments, user 210 may specify a coordinate, or a set of coordinates creating a closed polygon, which is attached to the user's address and used to determine the user's membership in a neighborhood, using the same coordinate system.

In some embodiments, the application server can store, in association with neighborhoods 220, addresses of all households located within the geographical areas associated with the neighborhoods. In that case, in block 308, the application server can locate, in a database, a household whose address matches the user's address.

In block 308, if the user's address falls within one of the existing neighborhoods 220, the process proceeds to block 310 and the application server assigns the user to the neighborhood. In some embodiments, an existing neighborhood can be associated not only with a geographical area, but with a membership group. Membership groups can include, for example, parent-teachers associations (PTAs), professional memberships, memberships based on hobbies, interests, ages, etc. For example, a neighborhood called "Seniors of Sampletown" can be associated both with a geographical area (e.g. defined by the boundaries of Sampletown) and with a membership group requiring that all its members are 65 years old or older. For neighborhoods associated with a geographical area and a membership group, the verification at block 306 can also include verifying that the user is a member of that group.

Furthermore, in some embodiments, some neighborhoods may only be associated with a membership group, and not a geographical area. In some embodiments it may be required that the membership group has a local nature, such as a membership group of "Parents of Marshall Lane Elementary students."

In block 308, the application server determines that the address does not fall within any of the existing neighborhoods 220, the process proceeds to block 312 and the application server can create a new neighborhood 220 whose boundaries will include the address. The boundaries of the new neighborhood can be manually defined by the user, but the application server can assist the user by automatically generating suggested boundaries. In other embodiments, the application server can determine the boundaries of the new neighborhood. 4 The application server can consider various factors when it generates the suggested boundaries, including, for example, the size of the enclosed area (e.g., in number of households), major man-made or natural boundaries (e.g., roads, rivers, parks), geographical borders (e.g., city, county, or state borders), boundaries of other neighborhoods 220, and so forth. For example, the application server can generate suggested boundaries such as to include a predefined number of households without crossing any major natural boundaries or boundaries of other neighborhoods 220. In an attempt to create a homogeneous neighborhood whose users would have many common interests and concerns, the application server can also consider factors, such as school districts, home prices, average age of residents, or any other relevant information.

In some embodiments, the suggested boundaries can be presented to the user on a map, for example, via internet access application 108. The user can manually modify the suggested boundaries, for example, by drawing new boundaries on the map or editing the suggested boundaries. In some embodiments, locations of the individual households can also be presented on the map for reference.

In some embodiments, the application server can apply certain restrictions on the shape or size of the boundaries of the new neighborhood. For example, application server may not allow the new neighborhood to overlap with any of the existing neighborhoods 220. In another example, the application server can set minimum and/or maximum restrictions on area size and/or population of the geographic area associated with the new neighborhood, where the population can be defined in either the number of households or the number of residents. For example, the application server can require that the new neighborhood contain at least 10 households but not more than 1000 households, and that its area does not exceed 1 square mile. In block 314, after the new neighborhood has been created, the application server assigns the user to the new neighborhood.

In some embodiments, each neighborhood 220 has at least one of its users designated as the neighborhood's moderator, or "lead." As will be illustrated below, a moderator can have certain administrative functions with respect to the neighborhood that regular users do not have. In some embodiments, in block 316, the user who creates a neighborhood 220 (i.e., the first user assigned to that neighborhood 220) is automatically designated as a moderator of that neighborhood 220. In some embodiments, neighborhood moderators are selected based on the length of their membership in the neighborhood, the amount of content they have generated (since joining or within a predefined period of time), the number of invitations they send, and so forth. Additionally or alternatively, new moderators can be nominated and/or selected by existing moderators or by other neighbors from the same neighborhood.

In some embodiments, internet access application 108 can present to a user a map of the area associated with the user's neighborhood 220. The map can include, for example, the boundaries of the user's neighborhood 220, the boundaries of nearby neighborhoods 220 in the region, and the locations and boundaries of the individual households in the area. The map can further include boundaries of the local police precincts, school district boundaries, city boundaries, or any other local information the neighbors may find useful.

In some embodiments, the map can also include an indication, for each of the individual households, whether the resident of that household has joined (i.e., has become a user of) online social network 200. If the resident has not joined the network, the user can invite that resident to join the network. For example, the user can compose a personal invitation message, provide that message to the application server, and a postcard containing the message will be mailed to that resident's address. As another example, the user can provide to the application server the email address or other contact information of the resident (e.g., the resident's Facebook or Twitter account), allowing the application server to contact the resident through using that contact information. As yet another example, the user can invite his or her friends on other social platforms by providing them with an invitation link. The link can be obtained by the user from the application server and the user can distribute the link to the invitee(s) via an email, a post in another online social network, a text message, etc. When the recipient of the invitation link follows the link (e.g., using a browser) he or she can be connected to the application server's "sign up" page. Information about the inviting user can be included in the link and recognized by the application server, in which case the application server can, for example, omit the address verification step at block 306 based on the that information. Furthermore, the application server can provide to the user a flyer (e.g., via email or on the website in a printable format or via regular mail) containing information about the online social network and (optionally) about the inviting user. The user can then physically distribute the flyers to his or her neighbors.

If the resident has already joined the network and is one of the users 210, the map can include information about that user, such as his or her personal name, username, status (e.g., online or offline), and offer some means to immediately contact that user, for example, by sending a personal message.

Online social network 200 allows its users to communicate in various ways. For example, a first user can send a personal message to a second user, the message being accessible only to these two users. Alternatively, a user can create a "post" (or a "thread"), a message that is accessible to multiple users, or a message that is sent to multiple users. In some embodiments, users who have access to a particular post can read the post, leave comment to the post, see other users' comments to the post, respond to comments by other users, and so on. This enables a forum-like discussion by multiple users on a particular topic.

In some embodiments, any user from a particular neighborhood 220 automatically has access to all communications posted by other members from the same neighborhood 220 with the intent to share them with all current and future members of the neighborhood 220. Thus, the user does not need to specifically identify those users, among the numerous users of online social network 200, whose communications this user would like to have access to. Instead, by having an automatic access to all communications originating from the user's neighborhood 220, the user is automatically "connected" to users who are likely to share at least one interest, interest in their local community. In addition, users from the same local community often share many other interests, as they often have the same socio-economic and cultural backgrounds.

In some embodiments, a user, after logging into online social network 200, can see (e.g., using internet access application 108) a chronological feed of all posts that the user has access to. However, if too many posts are accessible to the user, the user may not have the time to read or even skim through all of them, which can be frustrating for the user. Therefore, in some embodiments, the amount of accessible posts is controlled by a) restricting the neighborhood size (e.g., when a new neighborhood is created) to a predefined number of households, and/or b) by default, restricting the user's access to communications (e.g., posts) by users from the same neighborhood only. The latter restriction means that, by default, the user cannot see any communications created by users outside of his or her neighborhood. In addition, content available to the user can be filtered and/or prioritized based on the user's personal interests, as determined, for example, based on the user's past activities in online social network 200 (e.g. by analyzing the topics and/or the authors of the posts on which the user often comments) or based on the user's express selection of topics he or she is interested in.

3. Nearby Neighborhoods

Sometimes, users may wish to engage in discussions with users outside of their immediate neighborhood 220. For example, there may be matters that concern residents from several neighborhoods (e.g., city council elections) and it would be beneficial to discuss those matters in a larger forum. To address these needs, in some embodiments, a user can have access to "Nearby Neighborhoods," neighborhoods other than the user's neighborhood 220, but in proximity thereto. Having access to "Nearby Neighborhoods" may enable members to: make a post with the intent to share it with members of their "Nearby Neighborhoods," in addition to their own neighborhood; read or comment on posts created by other members of their "Nearby Neighborhoods" with the intent to share it with the authors' "Nearby Neighborhoods," which may or may not be the same as the viewing member's "Nearby Neighborhoods"; read all comments on posts created by other members of their "Nearby Neighborhoods" with the intent to share with the authors' "Nearby Neighborhoods", even if the authors of some comments are not members of the viewing member's "Nearby Neighborhoods." In some embodiments, access to "Nearby Neighborhoods" is enabled by default, and the user can "opt out" of it. In other embodiments, the access is disabled by default, and the user can "opt in" to it.

In some embodiments, the application server can automatically select, for each neighborhood 220, a set of one or more neighborhoods 220 that qualify as its nearby neighborhoods, also described as the "Nearby Neighborhoods" set or the NN-set.

Figure 4:
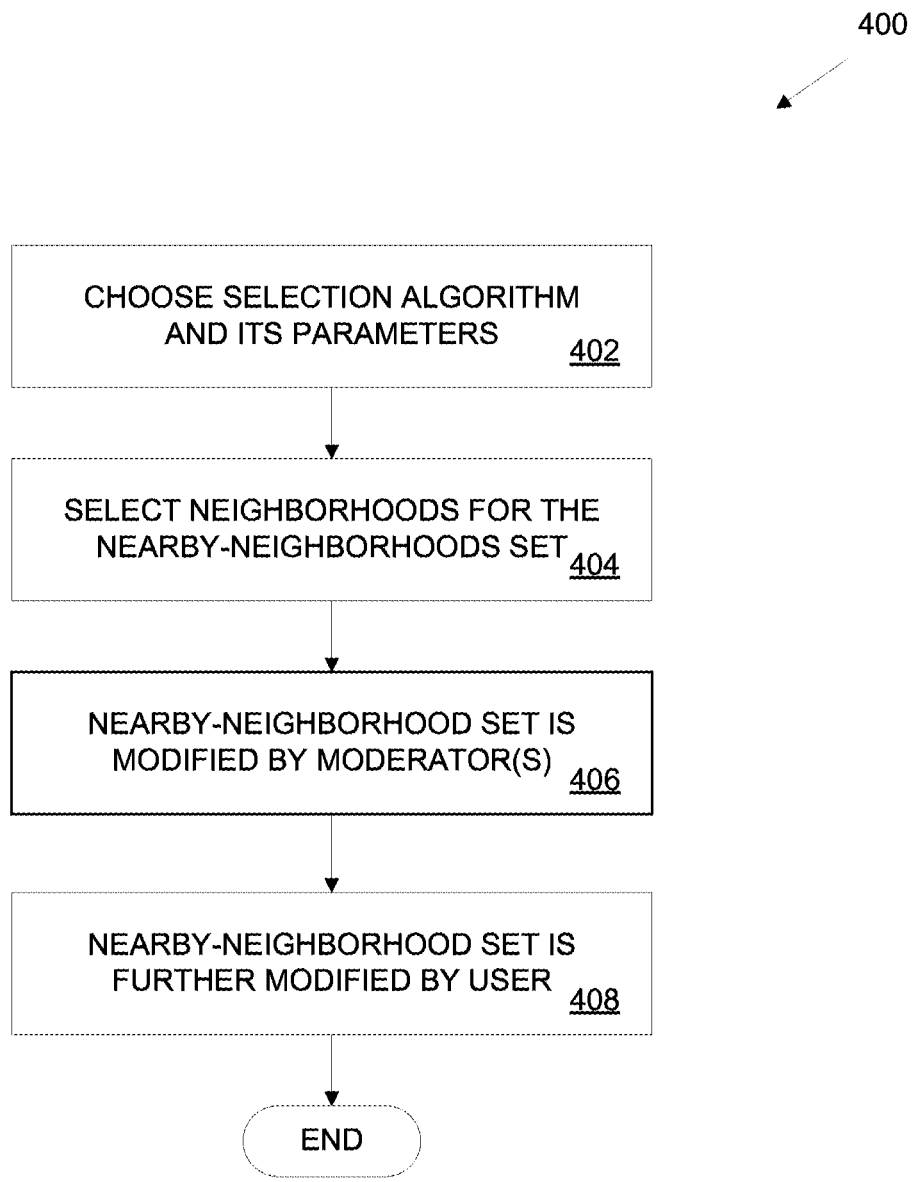
FIG. 4 illustrates a method of selecting and adjusting a nearby neighborhood list for a particular neighborhood of the online social network.

FIG. 4 illustrates a method 400 of selecting and adjusting the NN-set for a particular neighborhood 220 ("neighborhood N") of the online social network 200, in accordance with a disclosed embodiment. Method 400 can be performed, for example, by an application server (e.g., application server 102) when neighborhood N is created.

In block 402, method 400 can choose an algorithm and its parameters for selecting the NN-set for a particular neighborhood 220. In some embodiments, the chosen algorithm and parameters may apply for more than one neighborhood. In some embodiments, the method can choose a predefined default algorithm and/or its parameters. In other embodiments, the algorithm and its parameters are chosen by administrators of the online social networks.

In some embodiments, one of the algorithm's parameters used is population threshold. The population threshold can indicate a maximum number of households (or individual residents) to be included in the neighborhoods belonging to the NN-set. The population threshold can either include or exclude the population of neighborhood N itself. Furthermore, the population threshold can either include or exclude potential users, that is, households (or individual residents) that have not yet joined online social network 200. In some embodiments, the population threshold is a fixed and predefined number.

In other embodiments, the population threshold can be set based on the characteristics of neighborhood N, which are provided to the algorithm as parameters. Such characteristics can include, for example, the area size of neighborhood N, its population (in residents or in households), population density (population divided by area), housing prices, and so forth.

For example, the population threshold can be a monotonic decreasing, or non-increasing, function of the population density of neighborhood N. In other words, the population threshold can decrease as the population density increases. As a result, suburban neighborhoods with low population densities will receive higher population thresholds and will therefore receive an NN-set with a larger total population (e.g., 5,000 households), than their urban counterparts (e.g., 2,000 households). This can be advantageous, because there are typically fewer similarities between nearby neighborhoods in an urban area than in a suburban area. Accordingly, decreasing the threshold in urban areas reduces the likelihood that distant neighborhoods having little in common with neighborhood N will be included in its NN-set.

In block 404, after the algorithm and its parameters are chosen, the method selects neighborhoods 220 to be added to the NN-set of neighborhood N based on the algorithm and its parameters. For example, the method can execute the algorithm using one or more processors of application server 102.

In some embodiments, the algorithm selects those neighborhoods 220 that are geographically closest to neighborhood N and whose total population does not exceed (or does not substantially exceed) the population threshold. In some embodiments, the algorithm can sort all neighborhoods by their distance from neighborhood N, and add neighborhoods (from nearest to farthest) to NN-set until the total population of the added neighborhoods reaches the population threshold. The distance between two neighborhoods can be defined, for example, as the distance between the neighborhoods' centers, where the center can be defined, for example, as a geometric median of all the household locations in that neighborhood. Alternatively, a distance between two neighborhoods can be defined as the shortest distance between any household of the first neighborhood and any household of the second neighborhood.

In some embodiments, in addition to a neighborhood's distance from neighborhood N, the algorithm can include other factors in sorting the neighborhoods. One such factor can be the level of similarity between the two neighborhoods, for example, in terms of population density or housing prices. In other words, instead of sorting neighborhoods only by their distance from neighborhood N, the algorithm can also consider their similarity levels to neighborhood N. For example, the algorithm can assign a score to each neighborhood, where the score is in direct proportion to the similarity level and in reverse proportion to their distance, and then sort neighborhoods based on those scores. In this example, neighborhoods with high scores will be added to the NN-set first.

In some embodiments, the algorithm can create an NN-set for a given neighborhood by gradually adding the households around the neighborhood, from closest to the farthest, until the number of households reaches the population threshold. The algorithm can then add to the NN-set all neighborhoods that include at least one of those households.

It will be noted that if some of the added households do not belong to any existing neighborhoods, the total population of the neighborhoods added to the NN-set may be lower than the population threshold. If those households later become associated with newly created neighborhoods, those neighborhoods can be automatically added to the NN-set. Alternatively, if most of the added households belong to neighborhoods, the total population of the NN-set may exceed the population threshold. In either case, however, the total population of neighborhoods included in the NN-set is determined by, or correlates with the population threshold.

Figure 5:
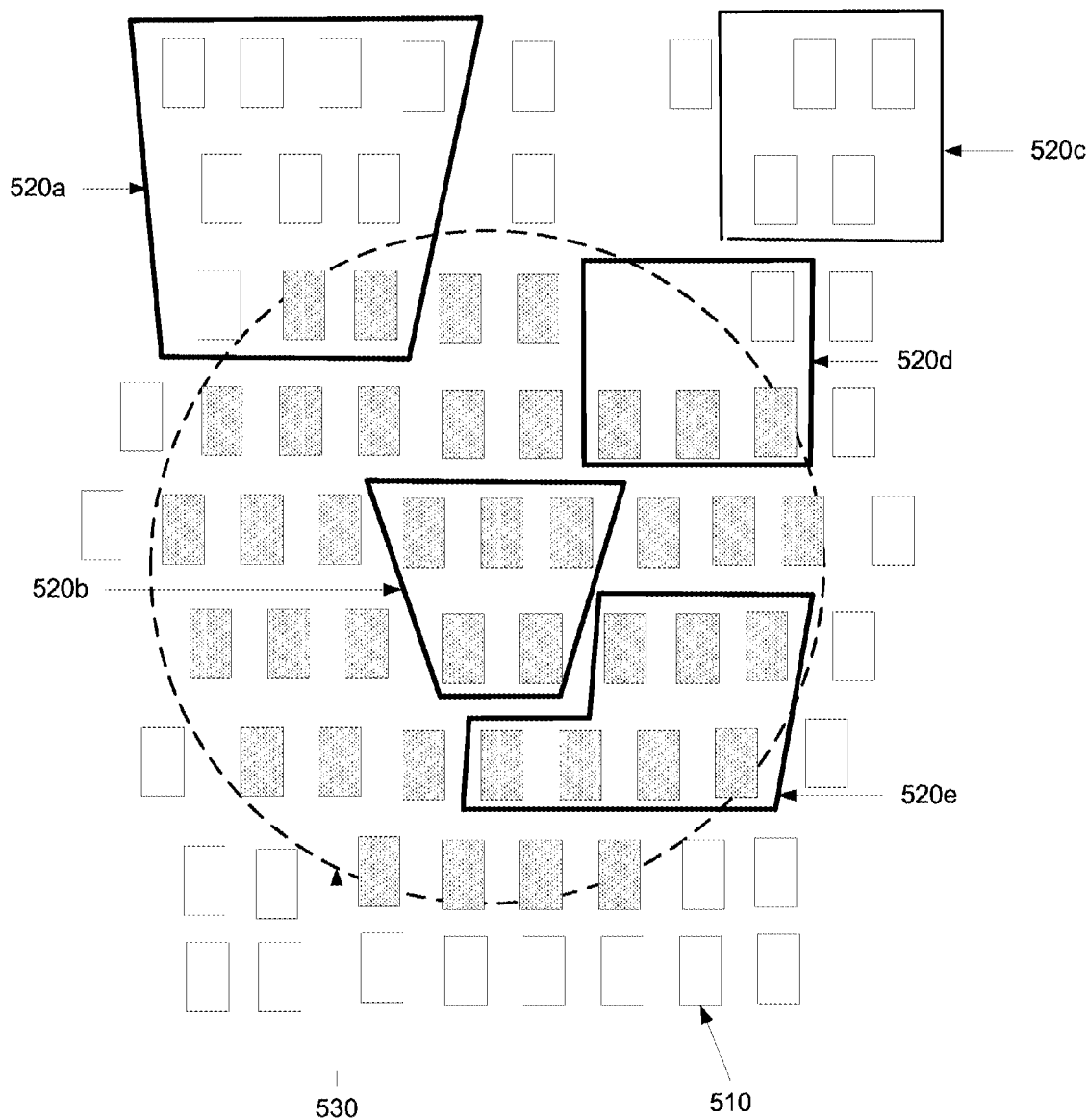
FIG. 5 illustrates a method of selecting a nearby neighborhood list for a particular neighborhood of the online social network.

FIG. 5 illustrates a method of selecting an NN-set for a particular neighborhood 220, of the online social network 200, in accordance to some embodiments. FIG. 5 shows households 510, only some of which are associated with neighborhoods 520a-520e. When neighborhood 520b is created, its NN-set can be determined, for example, in accordance with method 400.

For example, in the scenario shown in FIG. 5, the algorithm sets a threshold of 40 households, including the population of neighborhood 520b. The algorithm then starts adding households, going from the center of neighborhood 520b outward, until the number of households added reaches the threshold of 40. In other words, the algorithm increases the radius of a circle 530 (centered, for example, in the center of neighborhood 520b) until 40 households are included in the circle. The algorithm then adds, to the NN-set of neighborhood 520b, each neighborhood that includes any of the households that fall within that circle. In this example, neighborhoods 520d, 520e, and 520a, are added to the NN-set, but neighborhood 520c is not.

In some embodiments, instead of setting a population threshold, the algorithm sets an area threshold or a radius threshold, and adds to the NN-set all the neighborhoods which contain households within that area or radius. The area or radius threshold can also be set based on the characteristics of neighborhood N. For example, the area or radius threshold can increase as the population density of neighborhood N decreases, and vice versa.

In some embodiments, the algorithm considers both population and area/radius when selecting the NN-set. For example, the algorithm can run the population-based selection described above, but also have minimum and maximum restrictions on the area size, to avoid scenarios where the NN-set is too small or too large in terms of the total area of the neighborhoods included therein.

After the NN-set is created, the moderator of neighborhood N can modify the NN-set at block 406. For example, after examining the NN-set, the moderator can decide that some neighborhoods in that set should be removed from the set, for example, if the moderator has personal knowledge that those neighborhoods have little in common with neighborhood N. In some embodiments, the moderator can only remove neighborhoods from the NN-set, while in other embodiments the moderator can also add neighborhoods to the NN-set.

In some embodiments, the automatically generated and (optionally) moderator-modified NN-set applies to all users of neighborhood N by default. That is, if the user has access to nearby neighborhoods (either by opting in or by default), those nearby neighborhoods would be defined by that automatically generated and moderator-modified NN-set.

In some embodiments, in block 408, individual users can further modify the NN-set, as it applies to them. In other words, the user-modified NN-set will only apply to the user who modified it. In some embodiments, users can only modify their NN-set by removing neighborhoods from it, while in other embodiments users can also add neighborhoods to their NN-set.

To facilitate the modification of the NN-set by the moderator or by the user, the application server can present to the moderator/user a map or a list containing all the neighborhoods that can potentially be added or removed, allowing the moderator/user to make selections on that map or list.

Figure 6:
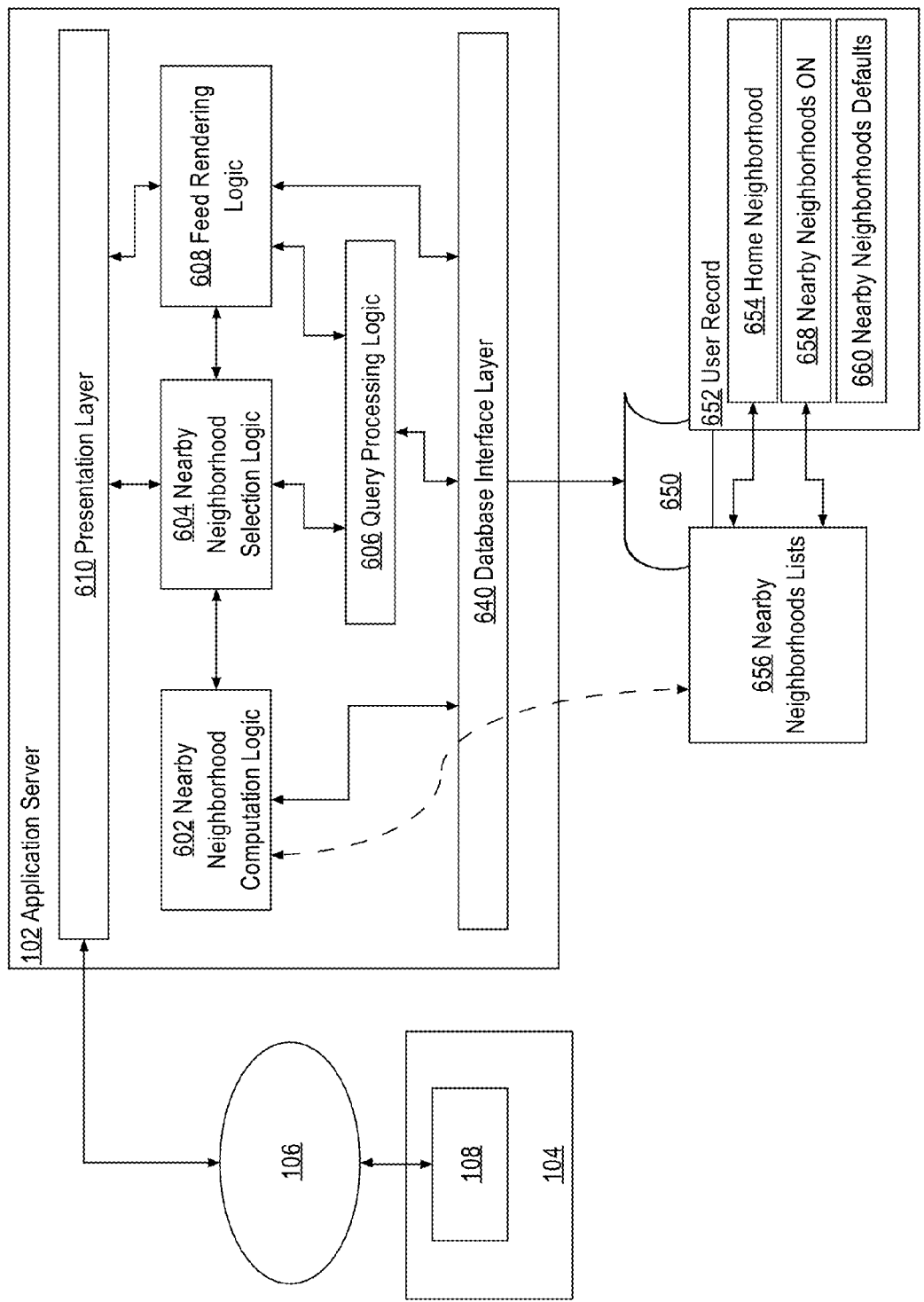
FIG. 6 illustrates a computer system with which an embodiment could be implemented.

4. Interacting with Messages, Posts and Other Data Based Upon Constraints Relating to Nearby Neighborhoods FIG. 6 illustrates a computer system with which an embodiment could be implemented. In an embodiment, the application server 102 (FIG. 1) may comprise nearby neighborhood computation logic 602, nearby neighborhood selection logic 604, feed rendering logic 608, query processing logic 606, a database interface layer 640 and a presentation layer 610. Each of the elements of FIG. 6 may be implemented in various embodiments using one or more computer programs, other software elements, and/or digital logic of the type further described herein for FIG. 14.

In an embodiment, the nearby neighborhood computation logic 602 is configured to determine one or more nearby neighborhoods that are nearby with respect to a particular neighborhood that is defined in the system; the resulting data may be stored, for example, in database 650 using one or more nearby neighborhoods lists 656 or tables that associate each defined neighborhood with a list of one or more nearby neighborhoods. The techniques described previously in section 3 herein may be used for the computation.

In an embodiment, the nearby neighborhood selection logic 604 is configured to perform the functions that are further described in this section with respect to generating graphical user interfaces that are configured to receive selections of neighborhoods, interpreting input to those interfaces, and updating records in database 650 in relation to selections. For example, database 650 may comprise a user record 652 for each user or member who has registered in the system and including at least a home neighborhood value 654, nearby neighborhoods value(s) 658 indicating which nearby neighborhoods are ON for the associated user, and nearby neighborhood default value(s) 660.

Database 650 also will store a large number of posts, messages and other content contributed by the users or members of the system. Each post or message may be represented in a table having appropriate columns indicating values such as user identifier, date and time, subject, content, neighborhood associations, links to replies, images or graphics, etc. These records are omitted for the purpose of illustrating a clear example of the specific techniques that are claimed herein.

The values in the user record 652 are used by the nearby neighborhood selection logic 604 to determine constraints for queries to the database 650 to provide to the feed rendering logic 608 for the purpose of rendering a feed of messages or posts to a particular user. Also for this purpose, the query processing logic 606 may be coupled to the nearby neighborhood selection logic 604 and the database interface layer 640 and may be configured to form queries in a database communication language such as SQL to submit through layer 650 to database 650. Result sets that the database 650 returns may be consumed by the nearby neighborhood selection logic 604 and/or passed to feed rendering logic 608 for use in forming a feed display for the particular user.

The presentation layer 610 is configured to generate one or more dynamic output pages such as HTML pages or JSON blobs that contain content capable of rendering and display using internet access application 108 of user device 104. For example, presentation layer 610 may comprise an HTTP application server or other logic that is capable of receiving a stream of message objects from feed rendering logic 608 and rendering an HTML document or other data output for presentation in a browser or other presentation logic at the user device 104.

Figure 7:
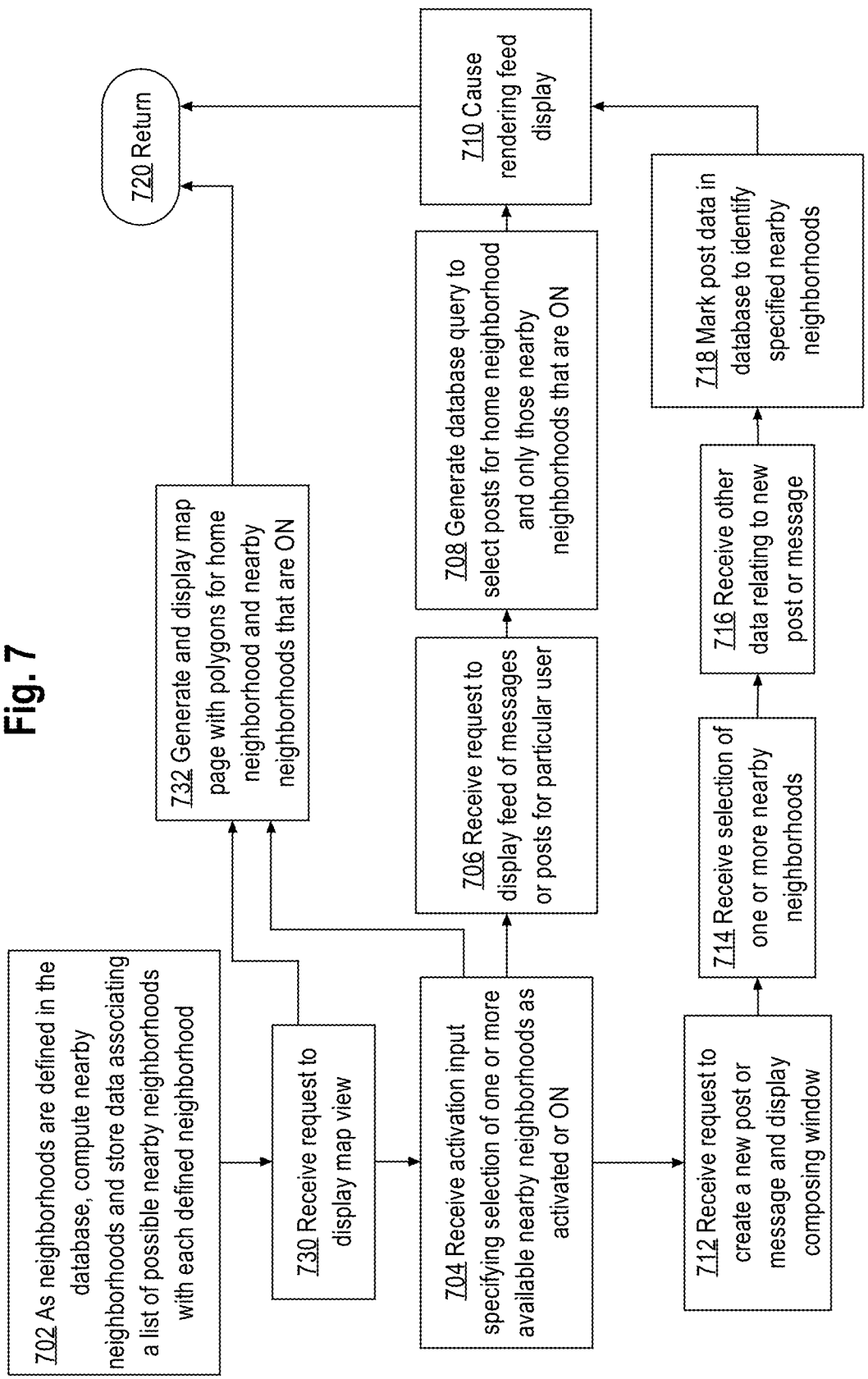
FIG. 7 illustrates a method of performing social networking data processing functions based upon relationships of a home neighborhood and one or more nearby neighborhoods.

FIG. 7 illustrates a method of performing social networking data processing functions based upon relationships of a home neighborhood and one or more nearby neighborhoods. The processes of FIG. 7 may be implemented in nearby neighborhood selection logic 604 in cooperation with other functional elements of FIG. 6. Further, the processes of FIG. 7 may be integrated with output displays having the format shown in the examples of FIG. 8, FIG. 9, FIG. 10, FIG. 11A, FIG. 11B, FIG. 12A, FIG. 12B, FIG. 13, which are described in subsequent sections.

At block 702, as neighborhoods are defined in the database, the process computes one or more nearby neighborhoods and stores data associating a list of possible nearby neighborhoods with each defined neighborhood. "Possible," in this context, means available for use in various functions, and associated with a particular defined neighborhood. The techniques of section 3 above may be used for the computation, which may occur, for example, in response to an administrative user defining boundaries of a new neighborhood in the database 650 and assigning a name and other metadata to that neighborhood.

Blocks 730, 704, 712 represent the initiation of different operations that may be requested at any time, or asynchronously, in response to user input and thus a sequential flow of the operations of these blocks is not necessarily required; indeed, all blocks of FIG. 7 are organized in sequences merely for convenience and to illustrate one possible operational example, but the blocks may be executed in different sequences at different times for different users. At block 730, a request to display a map view is received. The request of block 730 may comprise a user selecting a Map option in a user interface that is presented to the user upon logging in to the application server 102 using the user device 104.

At block 732, the process generates and displays a map page with polygons for the user's home neighborhood and for those nearby neighborhoods that are associated in the database 650 with the current user's home neighborhood and that are ON. Mechanisms for turning available nearby neighborhoods ON or OFF in relation to a user's home neighborhood are described further in other sections herein. Block 720 represents ending processing, and/or returning control to a calling process, or otherwise awaiting other asynchronous user action.

At block 704, input is received specifying a selection of one or more available nearby neighborhoods as ON. As noted above, block 702 could result in determining a set of two or more neighborhoods that are geographically near the user's home neighborhood, or even a very large set of neighborhoods. However, the user may not be interested in events, messages or posts relating to all the neighborhoods. Therefore, in an embodiment, the user may create or modify the list 658 of neighborhoods that are ON for that user. User interfaces for accepting such input are further described herein. As a result, a subset of all the neighborhoods that are associated in the list 656 of the database may be formed as list 658.

At block 706, the process receives a request to display a feed of messages or posts for the particular user. Block 706 may involve receiving a selection of a Home link, main page link, or feed link, in various embodiments. In response, at block 708 a database query is generated to select posts for the home neighborhood and for only those nearby neighborhoods that are ON in the user's list 658. For example, block 708 comprises forming a SQL SELECT query with constraints specifying that a source neighborhood value of a post in the database must match a particular identified one of the neighborhoods that is obtained from the user list 658; the query may comprise a string of such name-value pairs or otherwise specify all neighborhoods in the user list. Block 708 also represents receiving a result set from database 650 of only those message objects that are associated with one of the neighborhoods that are in the list 658 of nearby neighborhoods that are ON for the current user.

At block 710, the process causes rendering a feed display. As a result, the current user receives a display of all posts or messages for the user's home neighborhood, and all those for all the nearby neighborhoods that are ON in the user list 658. The union of such posts or messages may be displayed in reverse chronological order, for example, based upon a timestamp of each of the posts or messages without regard to the identity of the original neighborhoods.

At block 712, the process receives a request to create a new post or message, and causes displaying a composing window to receive data for the new post or message. For example, a user may select a link denoted New Post or something similar; in response, the process causes display a message compose window in which the user may enter a subject, body, and other values for the message.

At block 714, the process receives a selection of one or more nearby neighborhoods that the user wishes to associate with the post. In an embodiment, the nearby neighborhoods may be selected from only those neighborhoods that are currently ON for the current user as specified in the user list 658, or for all neighborhoods that have been administratively defined as near the user's home neighborhood. In any case, data identifying zero or more of the neighborhoods may be received. At block 716, other data for the message or post such as subject, body, and category are received. For purposes of an example, it may be assumed that the user enters data for these fields and then signals the intent to post the message to the location-based social network using a Post link or similar user interface widget.

At block 718, the process marks data associated with the post in the database to identify the specified nearby neighborhoods. In other words, the nearby neighborhoods that the user selected at block 714 are bound, in the database, as part of the metadata of a message or post. Thereafter, in rendering a feed display for the current user or for any other user who is within one of the neighborhoods that is associated with the post, the specified nearby neighborhoods serve as a constraint to control whether the newly created post or message appears in the feed display.

Figure 8:
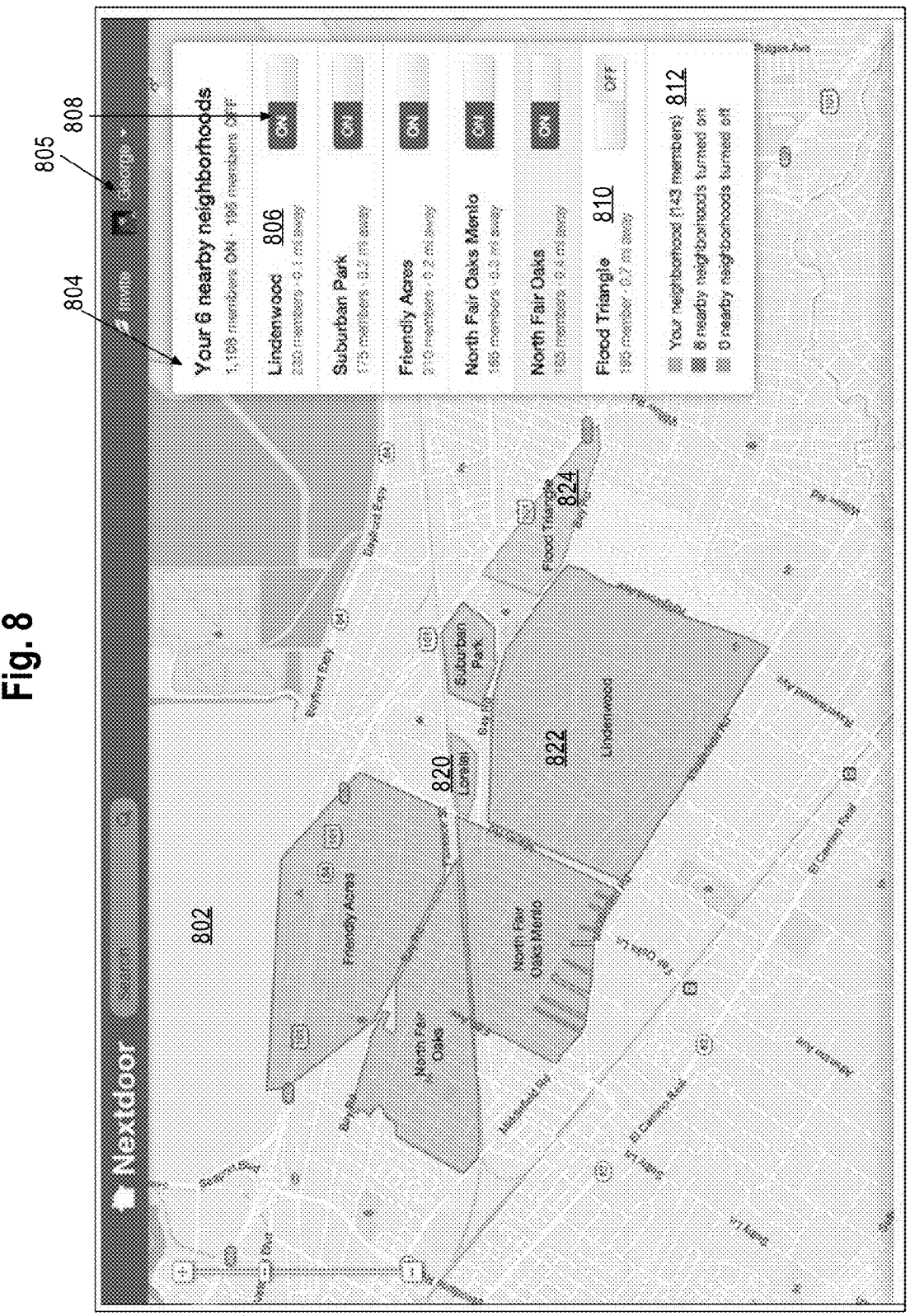
FIG. 8 illustrates a computer screen display configured to accept input selecting connection to one or more nearby neighborhoods.

FIG. 7 is not intended as an exhaustive illustration of all possible data processing that may be possible, described or implied in the description of FIG. 6, FIG. 8, and all other drawing figures herein. Other processes will become apparent from the following description.

FIG. 8 illustrates a computer screen display configured to accept input selecting connection to one or more nearby neighborhoods. In an embodiment, nearby neighborhood selection logic 604 may be configured to cause generating the screen display of FIG. 8 on a dynamic basis for any user device 104 that is associated with a user account that is accessing the application server 102. In general, the logic that generates FIG. 8 provides the ability for users to personalize their list of nearby neighborhoods for all purposes, and for each individual message or post that the user contributes to the social network.

In particular, FIG. 8 may comprise a Nearby Neighborhoods map page 802 with which members can turn ON or OFF any of the neighborhoods included in their list of Nearby Neighborhoods. In an embodiment, map page 802 comprises a list panel 804 that identifies nearby neighborhoods that have been computed in relation to the user's particular neighborhood by the nearby neighborhood computation logic 602. List panel 804 comprises a plurality of rows 806, 810 each associated with a particular other neighborhood, and each row comprises an ON/OFF widget 808 that is configured as a selectable or switchable graphical element. In embodiments that interoperate with touch-screen devices such as tablet computers, widget 808 may be selectable using touch between ON and OFF positions. As an example, row 806 is selected as a nearby neighborhood for the user and row 810 is not. By selectively changing the state of widget 808, members can choose to keep all Nearby Neighborhoods ON, keep only a few ON, or turn all of them OFF. In an embodiment, turning OFF a nearby neighborhood will remove posts created by that neighborhood from the website and emails. Turning OFF a nearby neighborhood also removes it from the neighborhoods included in the Nearby Neighborhoods section of the post box.

In response, nearby neighborhood selection logic 604 updates database 650 by modifying flag values, column values or other values associated with the user's account records to indicate which neighborhoods are selected ON or OFF. Further, in future display and posting operations, nearby neighborhood computation logic 602 is configured to read the flag values, column values or other values and apply filters so that only data for postings, messages or other on-screen data is obtained, used and/or generated as part of future pages that are delivered to that user. Thus, user manipulation of widgets 808 results in concrete changes in the operation of the logic 602 and therefore results in perceptible differences in the data that is displayed for a feed of postings, messages, and other data as described in connection with other displays.

List panel 804 also may comprise a summary row 812 that is generated by logic 602, 604 in cooperation and may identify a total number of members in nearby neighborhoods that are turned ON, the number of neighborhoods that are turned on, and the number that are off. In an embodiment, map page 802 may comprise polygons 820, 822, 824 that respectively identify the user's home neighborhood, one or more nearby neighborhoods that are turned ON, and one or more that are turned OFF. In the example of FIG. 8, the user's home neighborhood polygon 820 is denoted LORELAI, one or more nearby neighborhoods that are turned ON 822 include LINDENWOOD, and one or more that are turned OFF include FLOOD TRIANGLE. In an embodiment, each type of the foregoing three (3) types of neighborhoods may be displayed in a different distinctive representation such as color or highlighting. For example, the user's home neighborhood polygon may be shaded in a first color, one or more nearby neighborhoods that are turned ON polygon may be shaded in a second color, and one or more that are turned OFF polygon may be shaded in a third color.

Figure 9:
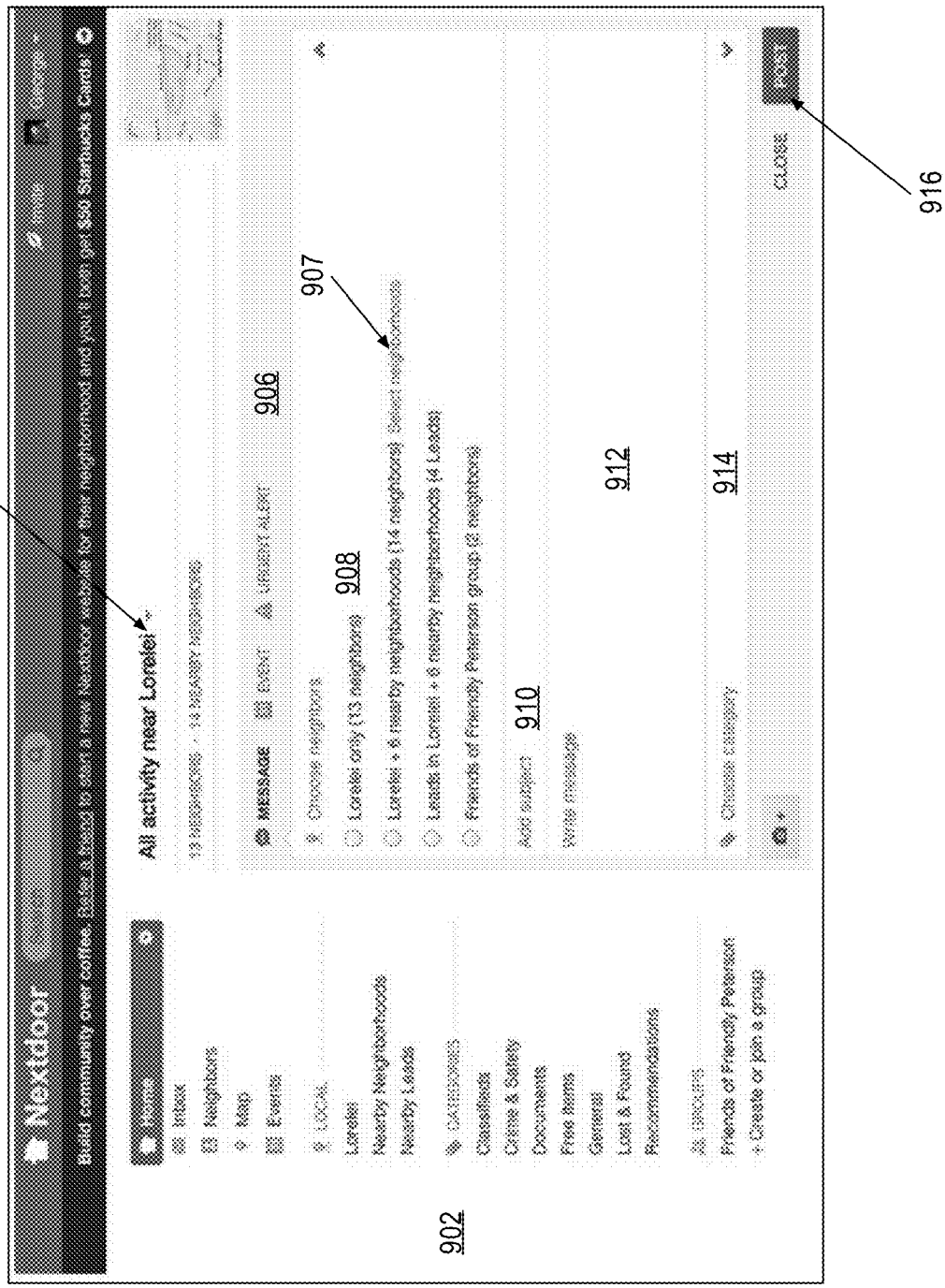
FIG. 9 illustrates a computer screen display configured to receive data composing a message that is selectively directed to one or more nearby neighborhoods.

In an embodiment, nearby neighborhood selection logic 604 also is configured to enable users to choose from their list of Nearby Neighborhoods on a per-post basis. Each such selection only applies to individual posts, and is designed for messages that are relevant only to a subset of the Nearby Neighborhood list. FIG. 9 illustrates a computer screen display configured to receive data identifying one or more nearby neighborhoods. In an embodiment, the interface of FIG. 9 enables a user to selectively specify one or more nearby neighborhoods from among a plurality of available nearby neighborhoods for a particular post. In an embodiment, the screen display 902 of FIG. 9 comprises a message composing region 906 having a plurality of neighbor selection radio buttons 908, subject region 910, body region 912, category menu 914, and Post button 916. In an embodiment, selecting one of the buttons 908 instructions the nearby neighborhood selection logic 604, when the Post button 916 is subsequently selected, to update database 650 to specify that the message of regions 910, 912, 914 is associated only with the neighbors specified by the radio button. As a result, the post will be displayed in a feed to only those parties that are identified in association with the selected radio button in future feed computation and display operations.

Figure 10:
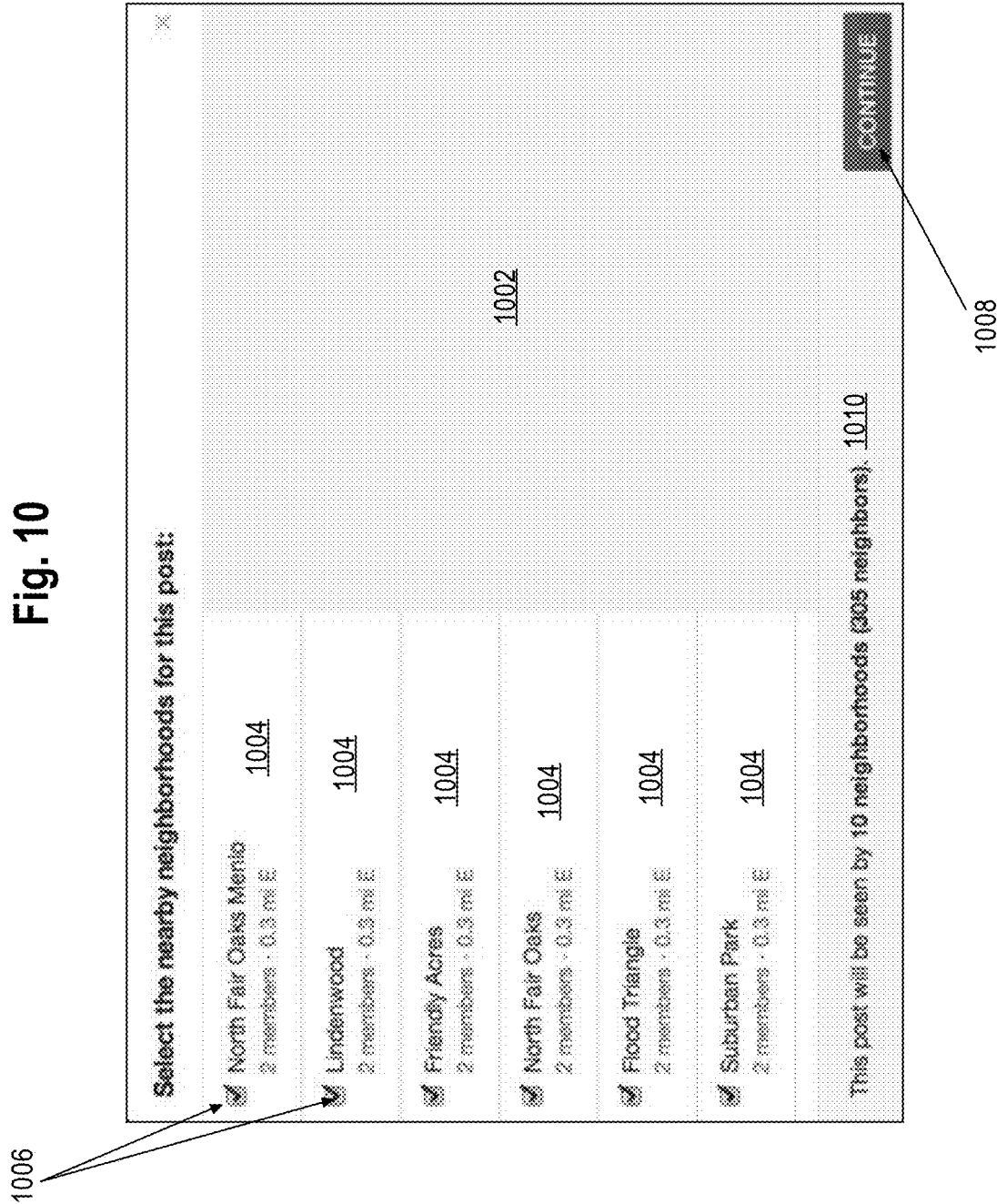
FIG. 10 illustrates a computer screen display configured to receive data that constrains a posted item to one or more nearby neighborhoods.

In an embodiment, one or more of the radio buttons 908 are associated with a Select Neighborhoods link 907 which when selected permits the user to select one or more nearby neighborhoods from among a plurality of nearby neighborhoods to associated with the message or post. In response to input indicating a selection of link 907, the nearby neighborhood selection logic 604 causes displaying a second window, which may be a pop-up window or panel, in the format of FIG. 10. FIG. 10 illustrates a computer screen display configured to receive data that constrains a posted item to one or more nearby neighborhoods. In an embodiment, the screen display 1002 of FIG. 10 comprises a list of available nearby neighborhood items 1004 that have been computed by the nearby neighborhood computation logic 602 in the manner described above. Each item 1004 identifies a nearby neighborhood by name and may also specify other neighborhood data such as the number of members or users registered in the system and the distance to that neighborhood from the user's home neighborhood.

Each item 1004 further comprises a checkbox 1006 that may be checked or unchecked in response to user input. In response to checking or unchecking checkboxes 1006, code hosted in internet access application 108 (FIG. 1) may compute a total number of checked neighborhoods and the total number of members in them for display in a message region 1010. In an embodiment, a Continue button 1008 is provided in screen display 1002 and selecting the Continue button causes the checkbox selections to propagate to the message of FIG. 9. In one embodiment, in response, data in FIG. 9 is recomputed and redisplayed to update the neighborhood counts that are shown within the text accompanying the buttons 908, and any message that is completed and posted using Post button 916 will be marked for display to feeds of members in those neighborhoods.

In an embodiment, the nearby neighborhood selection logic 604 is configured to manage data in database 650 that identifies one or more lead users or members, denoted Leads, for each of the neighborhood. A Lead is a local administrator who may access a specialized portal or set of displays that provide functions not available to other members for purposes of managing posts and messages that are associated with a neighborhood. In an embodiment, the nearby neighborhood selection logic 604 is configured to provide interfaces to Leads and receive input from Leads that specifies removing posts regardless of the author's neighborhood.

Figure 11A:
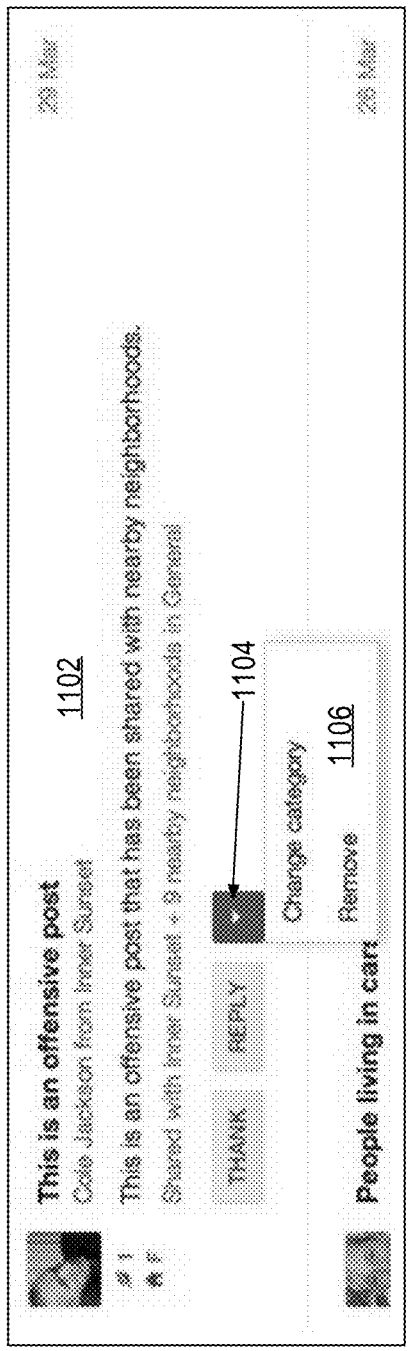
FIG. 11A illustrates a computer screen display configured to receive data that changes or removes an offensive posted item that was directed to a plurality of nearby neighborhoods.

FIG. 11A illustrates a computer screen display configured to receive data that changes or removes an offensive posted item that was directed to a plurality of nearby neighborhoods. In this example, a screen display 1102 identifies a post of a member in a particular neighborhood using a title, member name, neighborhood name, and subject matter. The post may also indicate the other neighborhoods with which it has been shared. In an embodiment, the Lead's display includes a pull-down widget 1104 which, when selected, causes generating a menu 1106 that includes at least a Remove option. Other options, such as Change Category to cause changing a category of a post, may be provided. In an embodiment, input selecting the Remove option in menu 1106 causes the nearby neighborhood selection logic 604 to mark the post in database 650 as removed with respect to the Lead's neighborhood only. The effect of removal is to uncheck or mark the Lead's neighborhood as not included for purposes of determining whether the associated post should be included in the feeds of members of the Lead's neighborhood.

Figure 11B:
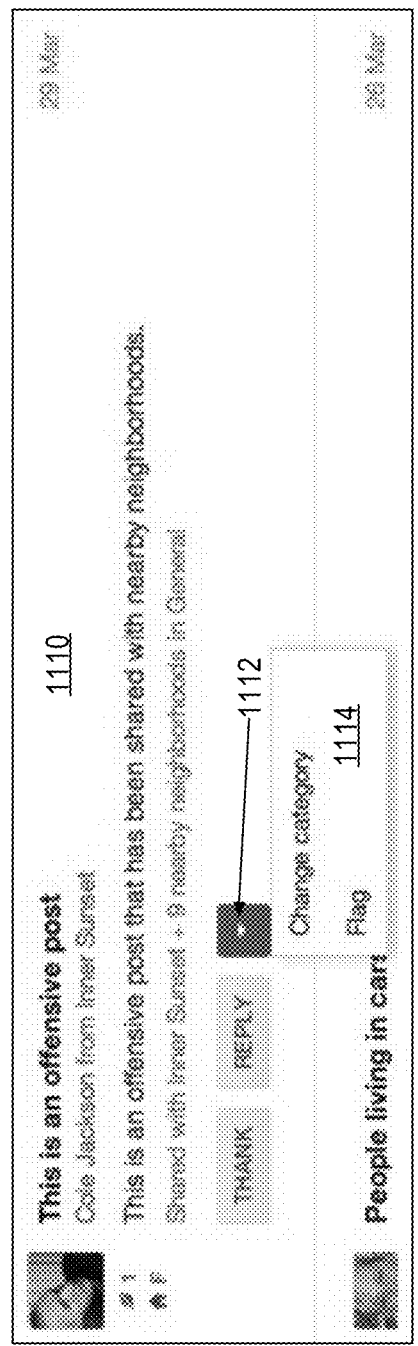
FIG. 11B illustrates a computer screen display configured to receive data that changes or flag an offensive posted item that was directed to a plurality of nearby neighborhoods.

In an embodiment, a function similar to that of FIG. 11A may be provided to members of a neighborhood, who have the ability to flag posts, which notifies the Leads of that Member's neighborhood. FIG. 11B illustrates a computer screen display configured to receive data that changes or flags an offensive posted item that was directed to a plurality of nearby neighborhoods. In this example, a screen display 1110 identifies a post of a member in a particular neighborhood using a title, member name, neighborhood name, and subject matter. The post may also indicate the other neighborhoods with which it has been shared. In an embodiment, the user's display includes a pull-down widget 1112 which, when selected, causes generating a menu 1114 that includes at least a Flag option. Other options, such as Change Category to cause changing a category of a post, may be provided. In an embodiment, input selecting the Flag option in menu 1114 causes the nearby neighborhood selection logic 604 to mark the post in database 650 as flagged with respect to the user's home neighborhood only. The effect of flagging is to cause generating an alert message to the Lead requesting the Lead to investigate whether to remove the flagged post. In some embodiments, the nearby neighborhood selection logic 604 may be configured to cause generating the alert message only after a threshold number of flagging actions have been performed by different members of the same neighborhood; for example the alert message could be generated only after three (3) flags of the same post have occurred.

Figure 12A:
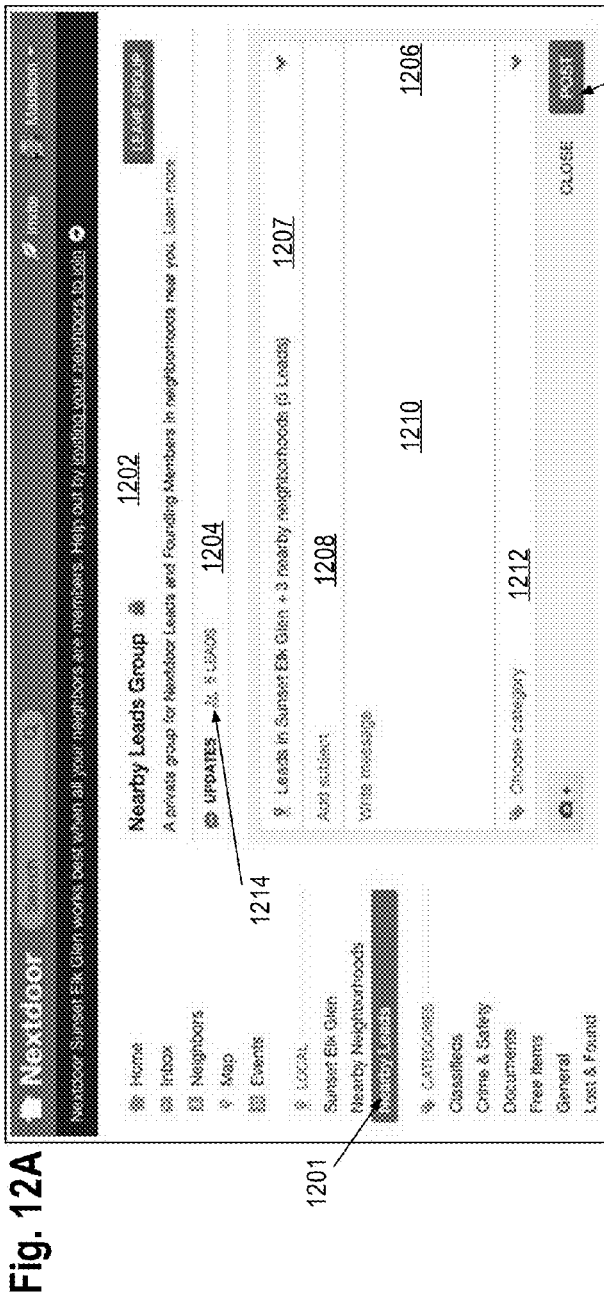
FIG. 12A illustrates a computer screen display configured to receive data for a message communicated only among lead representatives for a plurality of nearby neighborhoods.

In an embodiment, the nearby neighborhood selection logic 604 is configured to provide the ability for Leads in Nearby Neighborhoods to communicate in a private group. In an embodiment, Leads in a private group can post and view content in a private setting, access a list of all Nearby Leads and Founding Members, control how the Leads receive emails from the group through immediate delivery or batch delivery on a periodic basis, and other functions. As an example of selected functions, FIG. 12A illustrates a computer screen display configured to receive data for a message communicated only among lead representatives for a plurality of nearby neighborhoods. In an embodiment, a screen display 1202 comprises an updates region 1204, message composing region 1206, and side menu that includes an option 1201 for displaying the information about nearby Leads that is seen in FIG. 12A. In an embodiment, the updates region 1204 provides a signal that updated information for a specified number of Leads has been received previously and can be obtained from database 650 by selecting a link in the updates region. In an embodiment, the message composing region 1206 comprises a drop-down menu 1207, a subject region 1208, body region 1210, category menu 1212, and Post button 916. In an embodiment, selecting the drop-down menu 1207 enables the user to select whether to direct the message of message composing region 1206 to all Leads who are currently specified in the Nearby Leads group or to specified individuals; selecting the menu may cause the nearby neighborhood selection logic 604 to cause generating a drop-down list indicating the Leads in the group to permit selection.

Figure 12B:
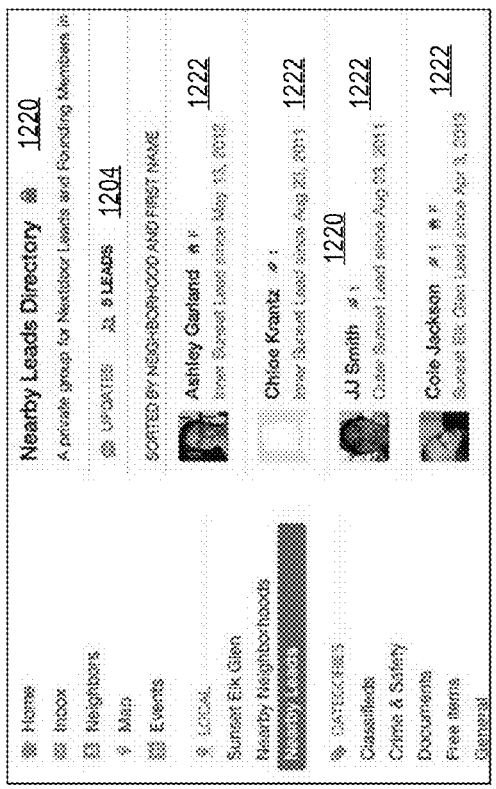
FIG. 12B illustrates a computer screen display configured to display data about lead representatives for a plurality of nearby neighborhoods.

In an embodiment, updates region 1204 comprises a directory link 1214 that is represented by a count of the number of Leads that are in the current Lead user's private group. In an embodiment, selecting the directory link 1214 causes the nearby neighborhood selection logic 604 to generate and display a directory of the users who are within the indicated group. For example, selecting directory link 1214 causes generating the display of FIG. 12B. FIG. 12B illustrates a computer screen display configured to display data about lead representatives for a plurality of nearby neighborhoods. In an embodiment, a directory display 1220 comprises the updates region 1204 in which the directory link 1214 is reproduced and displayed in emphasized format. A directory list 1220 is displayed and comprises a plurality of directory entries 1222 that may comprise a thumbnail image of an individual, a name, a neighborhood for whom the individual is the Lead, and other information. The specific content of the entries 1222 is not critical.

In an embodiment, the nearby neighborhood selection logic 604 is configured to enable a user to configure reduced prominence of Nearby Neighborhoods content in the newsfeed and emails. In an embodiment, to remove Nearby Neighborhoods content entirely from the newsfeed and emails, members can use the Nearby Neighborhoods map page of FIG. 8 to turn OFF any or all of their Nearby Neighborhoods. Further in an embodiment, if the user does not want to remove this content entirely, but wishes to sees the home neighborhood's content only on the homepage, then the user can set the default view of the home newsfeed to exclude Nearby Neighborhoods without affecting the Nearby Neighborhoods map or email settings.

Figure 13:
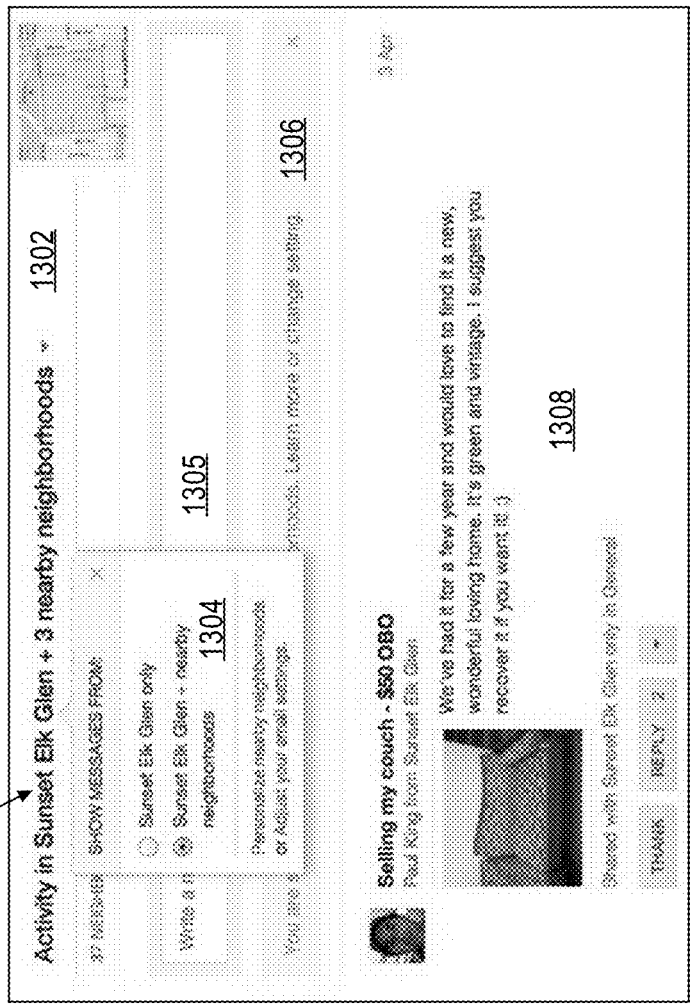
FIG. 13 illustrates a computer screen display configured to display message activity for a plurality of nearby neighborhoods and to receive input specifying only a local neighborhood or both the local neighborhood and the nearby neighborhoods.

FIG. 13 illustrates a computer screen display configured to display message activity for a plurality of nearby neighborhoods and to receive input specifying only a local neighborhood or both the local neighborhood and the nearby neighborhoods. In the example of FIG. 13, a screen display 1302 comprises a default view report 1303 that indicates what neighborhoods are then currently included in the feed of the user's home page, a post content region 1305 configured to receive the content of a post, an advisory message region 1306, and a feed display 1308. In an embodiment, the default view report 1303 is configured as a hyperlink which when selected causes nearby neighborhood selection logic 604 to display an overlay menu 1304 comprising radio buttons that are associated with different levels of information for the feed. For example, radio buttons in menu 1304 indicate: Show messages from the Sunset Elk Glen neighborhood only; show messages from the Sunset Elk Glen neighborhood and nearby neighborhoods. Selecting one of the radio buttons causes nearby neighborhood selection logic 604 to update configuration data for the user in database 650 to specify which level of filter, represented in the selected radio button, to apply to the user's feed display 1308 when it is prepared and displayed. Using the radio buttons of menu 1304, for example, the user can set the default view of the feed display 1308 to include only the home neighborhood, without changing the nearby neighborhoods that are specified for email messages or that are shown in the map page 802.

In an embodiment, each user or member of the social networking system depicted in the drawing figures may have a profile record in database 650 that stores data such as a username, password, email address, contact information, thumbnail image, interests, projects, and biographical data. The particular data that is part of a profile is not critical. Referring again to FIG. 8, in an embodiment the map page 802 as well as other pages displayed as part of the system may include a profile access link 805 which when selected permits the then current user to view or edit a profile of the user, and perform other administrative functions.

Embodiments also may include logic configured to support viewing profiles of other members who are in the current member's neighborhood. In an embodiment, a member of a home neighborhood is permitted to view profiles of all members within that neighborhood, but not view the profiles of members in nearby neighborhoods that are not the home neighborhood. Embodiments may include informational messages associated with profile viewing functions that inform the user when the display of profile details has been suppressed because the specified profile is not in the home neighborhood. For example, a profile of a neighbor in the home neighborhood may include a message such as "You can see Cole's profile because he lives in Sunset Elk Glen," where Sunset Elk Glen is the home neighborhood of the then-current user who is viewing the profile of another user, Cole. Similarly, the nearby neighborhood selection logic 604 may be configured to display a message such as "You cannot see JJ's profile because he is a nearby neighbor and does not live in Sunset Elk Glen". In an embodiment, if the current user does not post or reply to a message originating from a member in the Nearby Neighborhoods who is not in the home neighborhood, then the nearby neighbors cannot see the name or profile of that current user.

In an embodiment, the nearby neighborhood selection logic 604 may be configured to enable a particular user to share their profile with members who are in nearby neighborhoods. Sharing, in this context, means that when the current user posts a message or replies to a post of another member who is in one of the nearby neighborhoods and not in the home neighborhood, the current user's profile can be viewed by that other member and all others who are in the nearby neighborhood. In an embodiment, a user profile view accessed using link 805 includes a Sharing widget which can be turned ON. Other embodiments may permit enabling profile sharing from within the Nearby Neighborhoods setting page. Turning ON the Sharing widget has the effect of causing nearby neighborhood selection logic 604 to update a profile record of the current user in the database 650 to indicate that sharing is enabled, with a value indicating the neighborhood for which sharing is enabled. The updated value is then used in later operations. As one example, in responding to requests of members of the nearby neighborhood to view the profile of the current user who posted a message or reply; in such a case, the profile is displayed to the requesting user. As another example, in generating a feed view to members of the nearby neighborhood, the name and thumbnail image of the current user who posted the message or reply may be included in the feed view.

5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
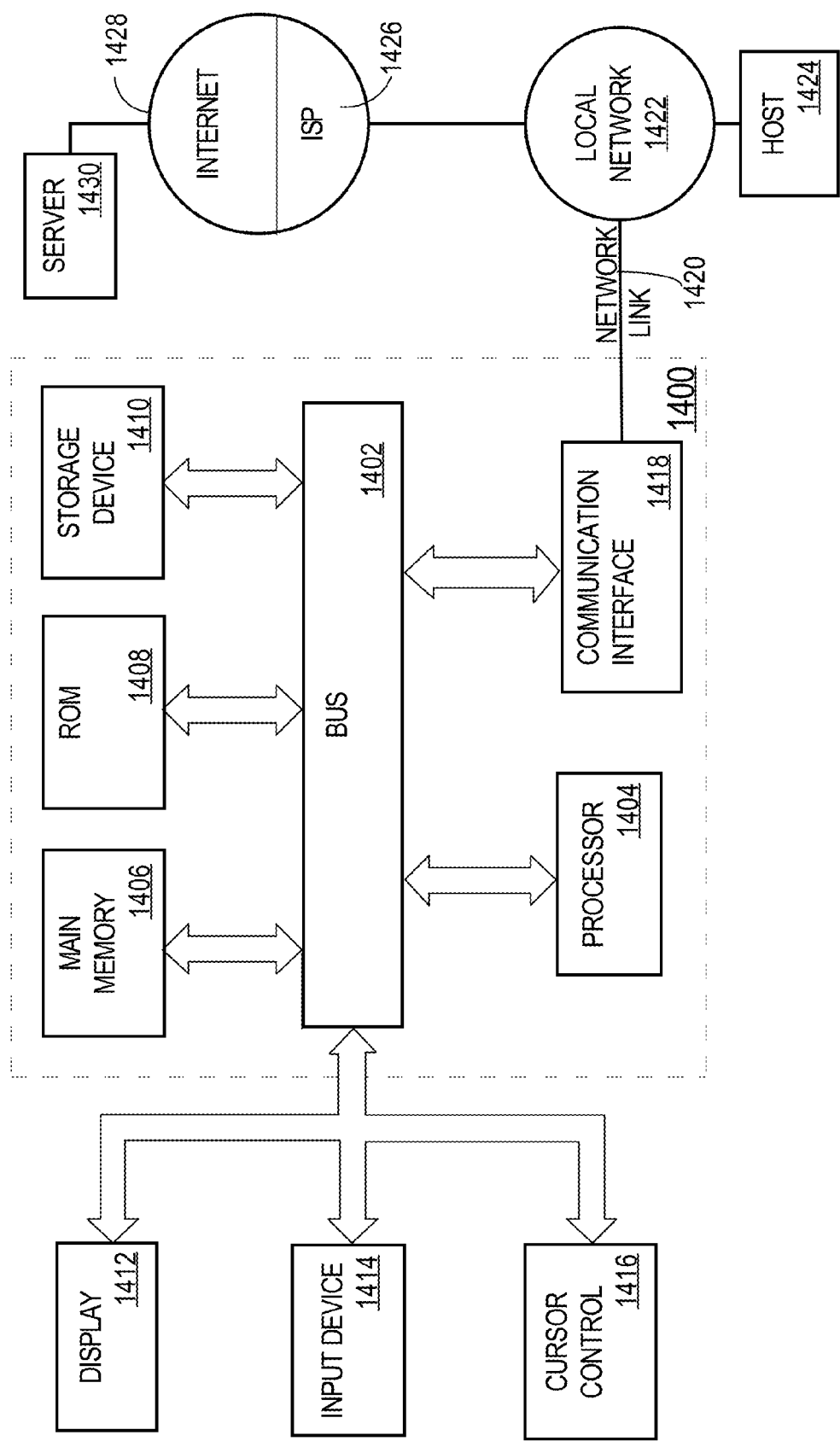
FIG. 14 illustrates a computer system with which an embodiment may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, Python, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the disclosed methods can be modified in any manner, including by reordering blocks or inserting or deleting blocks. It is intended, therefore, that the specification and examples be considered as example only, with a true scope and spirit being indicated by the following claims and their full scope of equivalents.

What is claimed is:

1. A computer system comprising:
   one or more processors;
   one or more non-transitory computer-readable storage media storing instructions which when executed cause:
   creating and storing in computer data storage neighborhood data defining a plurality of geographical neighborhoods based upon a plurality of vertices or boundaries;
   for each particular neighborhood among the plurality of neighborhoods, determining a set of nearby neighborhoods other than the particular neighborhood that are associated with a geographical area proximate to the particular neighborhood wherein a total population of the set of nearby neighborhoods does not exceed a population threshold, and storing the set of one or more nearby neighborhoods in association with the particular neighborhood;
   receiving from a second computer that is associated with a particular user account, activation input specifying a selection of one or more nearby neighborhoods, from a set of pre-determined nearby neighborhoods, as activated in association with the particular user account, wherein the set of pre-determined nearby neighborhoods is associated with a home neighborhood of the particular user account and wherein the activation input specifies fewer than all of the nearby neighborhoods in the set of pre-determined nearby neighborhoods;
   updating a database coupled to the computer system to associate the selections of one or more nearby neighborhoods as activated in association with the particular user account;
   receiving a request from the second computer to perform any of displaying a map page that includes the nearby neighborhoods, displaying a feed of messages, and creating a new message;
   in response to the request, performing causing the displaying the map page that includes the nearby neighborhoods, causing displaying the feed of messages, or the creating the new message based upon only the home neighborhood and the selections of the one or more nearby neighborhoods as activated in association with the particular user account.

2. The computer system of claim 1 comprising instructions which when executed cause:
   generating and causing displaying the map page with a plurality of polygons representing all the nearby neighborhoods that are associated with the geographical area proximate to the home neighborhood of the particular user account;
   generating and causing displaying, as part of the map page, a list panel comprising a plurality of rows each associated with a different one of the nearby neighborhoods, each row having a selection widget;
   using the computer, receiving from a second computer that is associated with a user account, activation input specifying selections of one or more of the selection widgets as ON wherein the activation input specifies fewer than all the one or more nearby neighborhoods;
   updating a database record associated with the particular user account to indicate that one or more of the nearby neighborhoods are activated in association with the particular user account.

3. The computer system of claim 2 comprising instructions which when executed cause updating and causing re-displaying the map page with a plurality of polygons, comprising a first polygon representing the home neighborhood that is associated with the user account, and a plurality of second polygons representing the one or more nearby neighborhoods that have been activated in response to selections of the selection widgets.

4. The computer system of claim 3 comprising instructions which when executed cause:
  receiving a selection of a neighborhood selection link;
  in response, displaying a list of available neighborhoods that are nearby neighborhoods associated with the home neighborhood of the user account;
  receiving selections of one or more available neighborhoods in the list;
  updating the database by storing the message record for the new message that binds the other data to the available neighborhoods that are identified in the selections of one or more available neighborhoods in the list.

5. The computer system of claim 1 comprising instructions which when executed cause:
  with the feed of messages, displaying a link that specifies the home neighborhood that is associated with the user account, and a reference to the one or more nearby neighborhoods that are activated in association with the particular user account;
  receiving a selection of the link;
  in response to receiving the selection of the link, causing generating and causing displaying a menu indicating the home neighborhood and a union of the home neighborhood and the one or more nearby neighborhoods that are activated in association with the particular user account;
  receiving menu input specifying the union of the home neighborhood and the one or more nearby neighborhoods that are activated in association with the particular user account;
  causing generating the feed of messages with only messages that are associated with the home neighborhood and the one or more nearby neighborhoods that are activated in association with the particular user account.

6. The computer system of claim 5 comprising instructions which when executed cause:
  receiving menu input specifying only the home neighborhood of the particular user account;
  causing generating the feed of messages with only messages that are associated with the home neighborhood.

7. The computer system of claim 1 comprising instructions which when executed cause generating and displaying the map page with a plurality of polygons, comprising a first polygon representing the home neighborhood that is associated with the user account, and a plurality of second polygons representing the one or more nearby neighborhoods that are activated in association with the particular user account.

8. The computer system of claim 1 comprising instructions which when executed cause generating and displaying the map page with a plurality of polygons, comprising a first polygon representing the home neighborhood that is associated with the user account, a first plurality of polygons representing the one or more nearby neighborhoods that are activated in association with the particular user account, and a second plurality of polygons representing one or more of the nearby neighborhoods that are not activated in association with the particular user account.

9. The computer system of claim 1 comprising instructions which when executed cause displaying each of the first polygon, the first plurality of polygons, and the second plurality of polygons using three different visual appearances.

10. The computer system of claim 1 comprising instructions which when executed cause:
  causing displaying a message composing window that includes a graphical user interface widget that is configured to receive an indication to associated the new message with nearby neighborhoods;
  receiving input indicating a selection of the home neighborhood and a plurality of nearby neighborhoods;
  receiving other data associated with creating the new message;
  updating the database by storing a message record for the new message that binds the other data to the plurality of nearby neighborhoods that were specified using the input.

11. The computer system of claim 1 wherein the instructions which cause determining the one or more nearby neighborhoods comprise instructions which cause:
  selecting one or more households associated with a geographic area proximate to the particular neighborhood, wherein the number of households does not exceed the population threshold; and
  for each of the one or more households, selecting a particular neighborhood associated with the household.

12. A computer-implemented method comprising:
  creating and storing in computer data storage neighborhood data defining a plurality of geographical neighborhoods based upon a plurality of vertices or boundaries;
  using a computer, for each particular neighborhood among the plurality of neighborhoods, determining a set of nearby neighborhoods other than the particular neighborhood that are associated with a geographical area proximate to the particular neighborhood wherein a total population of the set of nearby neighborhoods does not exceed a population threshold, and storing the set of one or more nearby neighborhoods in association with the particular neighborhood;
  using the computer, receiving from a second computer that is associated with a particular user account, activation input specifying a selection of one or more nearby neighborhoods, from a set of pre-determined nearby neighborhoods, as activated in association with the particular user account, wherein the set of pre-determined nearby neighborhoods is associated with a home neighborhood of the particular user account, and wherein the activation input specifies fewer than all of the nearby neighborhoods in the set of pre-determined nearby neighborhoods;
  updating a database coupled to the computer to associate the selections of one or more nearby neighborhoods as activated in association with the particular user account;
  using the computer, receiving a request from the second computer to perform any of displaying a map page that includes the nearby neighborhoods, displaying a feed of messages, and creating a new message;
  using the computer, in response to the request, performing causing the displaying the map page that includes the nearby neighborhoods, causing displaying the feed of messages, or the creating the new message based upon only the home neighborhood and the selections of the one or more nearby neighborhoods as activated in association with the particular user account.

13. The method of claim 12 comprising:
generating and causing displaying the map page with a plurality of polygons representing all the nearby neighborhoods that are associated with the geographical area proximate to the home neighborhood of the particular user account;
generating and causing displaying, as part of the map page, a list panel comprising a plurality of rows each associated with a different one of the nearby neighborhoods, each row having a selection widget;
using the computer, receiving from a second computer that is associated with a user account, activation input specifying selections of one or more of the selection widgets as ON wherein the activation input specifies fewer than all the one or more nearby neighborhoods;
updating a database record associated with the particular user account to indicate that one or more of the nearby neighborhoods are activated in association with the particular user account.

14. The method of claim 13 comprising updating and causing re-displaying the map page with a plurality of polygons, comprising a first polygon representing the home neighborhood that is associated with the user account, and a plurality of second polygons representing the one or more nearby neighborhoods that have been activated in response to selections of the selection widgets.

15. The method of claim 12 comprising:
causing displaying a message composing window that includes a graphical user interface widget that is configured to receive an indication to associated the new message with nearby neighborhoods;
receiving input indicating a selection of the home neighborhood and a plurality of nearby neighborhoods;
receiving other data associated with creating the new message;
updating the database by storing a message record for the new message that binds the other data to the plurality of nearby neighborhoods that were specified using the input.

16. The method of claim 15 wherein receiving the input comprises:
receiving a selection of a neighborhood selection link;
in response, displaying a list of available neighborhoods that are nearby neighborhoods associated with the home neighborhood of the user account;
receiving selections of one or more available neighborhoods in the list;
updating the database by storing the message record for the new message that binds the other data to the available neighborhoods that are identified in the selections of one or more available neighborhoods in the list.

17. The method of claim 12 comprising generating and displaying the map page with a plurality of polygons, comprising a first polygon representing the home neighborhood that is associated with the user account, and a plurality of second polygons representing the one or more nearby neighborhoods that are activated in association with the particular user account.

18. The method of claim 12 comprising generating and displaying the map page with a plurality of polygons, comprising a first polygon representing the home neighborhood that is associated with the user account, a first plurality of polygons representing the one or more nearby neighborhoods that are activated in association with the particular user account, and a second plurality of polygons representing one or more of the nearby neighborhoods that are not activated in association with the particular user account.

19. The method of claim 12 comprising causing displaying each of the first polygon, the first plurality of polygons, and the second plurality of polygons using three different visual appearances.

20. The method of claim 12 comprising:
with the feed of messages, displaying a link that specifies the home neighborhood that is associated with the user account, and a reference to the one or more nearby neighborhoods that are activated in association with the particular user account;
receiving a selection of the link;
in response to receiving the selection of the link, causing generating and causing displaying a menu indicating the home neighborhood and a union of the home neighborhood and the one or more nearby neighborhoods that are activated in association with the particular user account;
receiving menu input specifying the union of the home neighborhood and the one or more nearby neighborhoods that are activated in association with the particular user account;
causing generating the feed of messages with only messages that are associated with the home neighborhood and the one or more nearby neighborhoods that are activated in association with the particular user account.

21. The method of claim 12 comprising:
receiving menu input specifying only the home neighborhood of the particular user account;
causing generating the feed of messages with only messages that are associated with the home neighborhood.

22. The method of claim 12 wherein determining the one or more nearby neighborhoods includes:
selecting one or more households associated with a geographic area proximate to the particular neighborhood, wherein the number of households does not exceed the population threshold; and
for each of the one or more households, selecting a particular neighborhood associated with the household.

* * * * *

US009940008C1

(12) EX PARTE REEXAMINATION CERTIFICATE (11923rd)
United States Patent
Tolia et al.

(10) Number: US 9,940,008 C1
(45) Certificate Issued: *Oct. 12, 2021

(54) SOCIAL NETWORKING BASED ON NEARBY NEIGHBORHOODS

(71) Applicant: NEXTDOOR.COM, INC., San Francisco, CA (US)

(72) Inventors: Nirav N. Tolia, San Francisco, CA (US); Ryan Patrick Sims, San Francisco, CA (US); David Michael Wiesen, San Francisco, CA (US); Sean Christopher Bromage, San Francisco, CA (US); Rishi Mukhopadhyay, San Francisco, CA (US); Timothy Garleung Wong, San Francisco, CA (US); Michael Philip Balaban, San Francisco, CA (US); Madison Nixon Bell, San Francisco, CA (US)

(73) Assignee: NEXTDOOR, INC., San Francisco, CA (US)

Reexamination Request:
No. 90/014,693, Mar. 30, 2021

Reexamination Certificate for:
Patent No.: 9,940,008
Issued: Apr. 10, 2018
Appl. No.: 15/087,879
Filed: Mar. 31, 2016

( * ) Notice: This patent is subject to a terminal disclaimer.

Related U.S. Application Data

(63) Continuation of application No. 14/277,005, filed on May 13, 2014, now Pat. No. 10,078,431, which is a
(Continued)

(51) Int. Cl.
*H04W 4/21* (2018.01)
*H04W 4/021* (2018.01)
(Continued)

(52) U.S. Cl.
CPC ........ *G06F 3/04847* (2013.01); *G06F 3/0482* (2013.01); *G06F 3/04842* (2013.01);
(Continued)

(58) Field of Classification Search
None
See application file for complete search history.

(56) References Cited

To view the complete listing of prior art documents cited during the proceeding for Reexamination Control Number 90/014,693, please refer to the USPTO's public Patent Application Information Retrieval (PAIR) system under the Display References tab.

*Primary Examiner* — Peng Ke

(57) ABSTRACT

Disclosed embodiments relate to a system and a method of managing an online social network having a plurality of neighborhoods. The system may receive a location from a user, and select, based on the location, a neighborhood from the plurality of neighborhoods. The system may further assign the user to the selected neighborhood and grant the user access to communications by users assigned to the selected neighborhood. In an embodiment, a computer-implemented method comprises creating and storing in computer data storage neighborhood data defining a plurality of geographical neighborhoods based upon a plurality of vertices or boundaries; using a computer, for each particular neighborhood among the plurality of neighborhoods, determining one or more nearby neighborhoods is associated with a geographical area proximate to the particular neighborhood; using the computer, receiving from a second computer that is associated with a user account, activation input specifying selections of one or more nearby neighborhoods as activated in association with the particular user account, wherein the activation input specifies fewer than all the one or more nearby neighborhoods; updating a database coupled to the computer to associate the selections of one or more nearby neighborhoods as activated in association with the particular user account; using the computer, receiving a
(Continued)

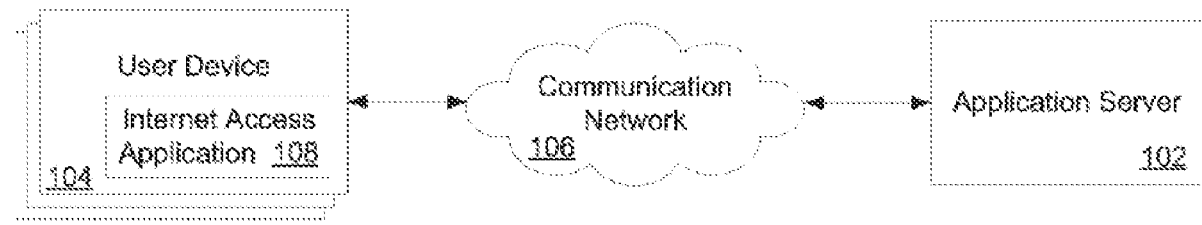

request from the second computer to perform any of displaying a map page that includes the nearby neighborhoods, displaying a feed of messages, and creating a new message; using the computer, in response to the request, performing causing the displaying the map page that includes the nearby neighborhoods, causing displaying the feed of messages, or the creating the new message based upon only the selections of the one or more nearby neighborhoods as activated in association with the particular user account.

Related U.S. Application Data continuation-in-part of application No. 13/757,574, filed on Feb. 1, 2013, now abandoned.

(51) Int. Cl.
*G06F 3/0484* (2013.01)
*G06F 16/29* (2019.01)
*G06F 3/0482* (2013.01)
*G06Q 10/10* (2012.01)
*G06Q 50/00* (2012.01)

(52) U.S. Cl.
CPC ............. *G06F 16/29* (2019.01); *G06Q 10/10* (2013.01); *G06Q 50/01* (2013.01); *H04W 4/021* (2013.01); *H04W 4/21* (2018.02)

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-22 is confirmed.

\* \* \* \* \*